(12) United States Patent
Edge

(10) Patent No.: US 9,042,917 B2
(45) Date of Patent: May 26, 2015

(54) POSITIONING FOR WLANS AND OTHER WIRELESS NETWORKS

(75) Inventor: Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 730 days.

(21) Appl. No.: 11/557,451

(22) Filed: Nov. 7, 2006

(65) Prior Publication Data
US 2007/0121560 A1    May 31, 2007

Related U.S. Application Data

(60) Provisional application No. 60/734,631, filed on Nov. 7, 2005, provisional application No. 60/748,225, filed on Dec. 6, 2005.

(51) Int. Cl.
*H04W 24/00* (2009.01)
*G01S 3/02* (2006.01)
*H04W 64/00* (2009.01)

(52) U.S. Cl.
CPC .................................... *H04W 64/00* (2013.01)

(58) Field of Classification Search
CPC .................................................... H04W 64/00
USPC ......... 370/388, 338, 349; 455/456.1, 561, 65, 455/456.4, 456.6, 457; 342/420, 387, 453; 705/5
See application file for complete search history.

(56) References Cited

U.S. PATENT DOCUMENTS

| 5,276,905 A | 1/1994 | Hurst et al. |
| 5,276,906 A | 1/1994 | Felix |
| 5,327,144 A | 7/1994 | Stilp et al. |
| 5,512,908 A | 4/1996 | Herrick |
| 5,708,975 A | 1/1998 | Heiskari et al. |

(Continued)

FOREIGN PATENT DOCUMENTS

| CA | 2296812 A1 | 8/2000 |
| CN | 1334688 A | 2/2002 |

(Continued)

OTHER PUBLICATIONS

Anonymous, "3rd Generation Partnership Project 2 '3GPP2'", Internet Article, Version 1.0 (online), Oct. 2005, Section 4 (6 pages).

(Continued)

*Primary Examiner* — Opiribo Georgewill

(57) ABSTRACT

Techniques for positioning access points and terminals in WLANs and other wireless networks are described. For access point positioning, measurements are obtained for at least one access point in a WLAN. The measurements may be based on transmission sequences (e.g., beacon frames) transmitted periodically by each access point. The measurements may be made by multiple terminals at different locations or a single mobile terminal at different locations. The location of each access point is determined based on the measurements and known locations of the terminal(s). For terminal positioning, measurements for at least one access point in a WLAN are obtained. The location of the terminal is determined based on the measurements and known location of each access point. The measurements may be round trip time (RTT) measurements, observed time difference (OTD) measurements, time of arrival (TOA) measurements, signal strength measurements, signal quality measurements, etc.

17 Claims, 10 Drawing Sheets

(56) References Cited

U.S. PATENT DOCUMENTS

| | | |
|---|---|---|
| 5,717,406 A | 2/1998 | Sanderford |
| 5,805,581 A | 9/1998 | Uchida et al. |
| 5,812,087 A | 9/1998 | Krasner |
| 5,841,396 A | 11/1998 | Krasner |
| 5,874,914 A | 2/1999 | Krasner |
| 5,945,944 A | 8/1999 | Krasner |
| 5,999,124 A | 12/1999 | Sheynblat |
| 6,055,434 A | 4/2000 | Seraj |
| 6,061,018 A | 5/2000 | Sheynblat |
| 6,091,362 A | 7/2000 | Stilp et al. |
| 6,108,558 A * | 8/2000 | Vanderspool, II ......... 455/456.2 |
| 6,111,538 A | 8/2000 | Schurchman et al. |
| 6,128,492 A | 10/2000 | Chung |
| 6,147,644 A | 11/2000 | Castles et al. |
| 6,185,427 B1 | 2/2001 | Krasner et al. |
| 6,208,290 B1 | 3/2001 | Krasner |
| 6,215,442 B1 | 4/2001 | Sheynblat et al. |
| 6,230,018 B1 | 5/2001 | Watters et al. |
| 6,236,365 B1 | 5/2001 | Leblanc et al. |
| 6,236,635 B1 | 5/2001 | Miyamoto et al. |
| 6,249,252 B1 | 6/2001 | Dupray |
| 6,271,788 B1 | 8/2001 | Longaker et al. |
| 6,275,707 B1 | 8/2001 | Reed et al. |
| 6,353,412 B1 | 3/2002 | Soliman |
| 6,389,291 B1* | 5/2002 | Pande et al. ................. 455/456.5 |
| 6,414,635 B1 | 7/2002 | Stewart et al. |
| 6,420,999 B1 | 7/2002 | Vayanos |
| 6,430,415 B1 | 8/2002 | Agashe et al. |
| 6,445,927 B1 | 9/2002 | King et al. |
| 6,466,938 B1 | 10/2002 | Goldberg |
| 6,593,863 B2 | 7/2003 | Pitio |
| 6,597,916 B2 | 7/2003 | Edge |
| 6,650,288 B1 | 11/2003 | Pitt et al. |
| 6,677,894 B2 | 1/2004 | Sheynblat et al. |
| 6,677,895 B1 | 1/2004 | Holt |
| 6,704,574 B2 | 3/2004 | Lin |
| 6,754,488 B1* | 6/2004 | Won et al. ..................... 455/424 |
| 6,757,545 B2* | 6/2004 | Nowak et al. .............. 455/456.2 |
| 6,799,047 B1* | 9/2004 | Bahl et al. ................. 455/456.1 |
| 6,801,778 B2 | 10/2004 | Koorapaty et al. |
| 6,865,395 B2 | 3/2005 | Riley |
| 6,888,811 B2 | 5/2005 | Eaton et al. |
| 6,937,867 B2 | 8/2005 | Oda et al. |
| 6,941,145 B2 | 9/2005 | Ogino et al. |
| 6,956,527 B2 | 10/2005 | Rogers et al. |
| 6,990,428 B1* | 1/2006 | Kaiser et al. .................. 702/150 |
| 7,006,834 B2 | 2/2006 | Gaal et al. |
| 7,006,838 B2 | 2/2006 | Diener et al. |
| 7,039,418 B2 | 5/2006 | Amerga et al. |
| 7,054,627 B1 | 5/2006 | Hillman |
| 7,068,999 B2 | 6/2006 | Ballai |
| 7,127,257 B2 | 10/2006 | Riley et al. |
| 7,139,580 B2 | 11/2006 | Stein et al. |
| 7,142,848 B2 | 11/2006 | Owen et al. |
| 7,149,531 B2 | 12/2006 | Misikangas |
| 7,206,585 B2 | 4/2007 | Gilham et al. |
| 7,215,281 B2 | 5/2007 | Tekinay et al. |
| 7,224,982 B2 | 5/2007 | Ormson |
| 7,248,858 B2 | 7/2007 | Barber et al. |
| 7,257,411 B2 | 8/2007 | Gwon et al. |
| 7,257,413 B2 | 8/2007 | Sheynblat |
| 7,280,505 B2 | 10/2007 | Chaskar et al. |
| 7,295,808 B2 | 11/2007 | Soliman |
| 7,319,878 B2 | 1/2008 | Sheynblat et al. |
| 7,369,859 B2 | 5/2008 | Gallagher |
| 7,706,813 B2 | 4/2010 | Shim |
| 7,778,639 B2 | 8/2010 | Shim |
| 7,873,375 B2 | 1/2011 | Annunziato et al. |
| 8,068,056 B2 | 11/2011 | Wachter et al. |
| 8,483,717 B2 | 7/2013 | Sheynblat |
| 2001/0046869 A1* | 11/2001 | Cedervall et al. ............. 455/456 |
| 2002/0055362 A1* | 5/2002 | Aoyama ....................... 455/456 |
| 2002/0080759 A1* | 6/2002 | Harrington et al. ........... 370/338 |
| 2002/0137526 A1 | 9/2002 | Shinohara |
| 2002/0167444 A1* | 11/2002 | Lee ............................... 342/387 |
| 2002/0168989 A1 | 11/2002 | Dooley et al. |
| 2002/0199196 A1 | 12/2002 | Rabinowitz et al. |
| 2003/0006931 A1 | 1/2003 | Mages |
| 2003/0008663 A1 | 1/2003 | Stein et al. |
| 2003/0008664 A1 | 1/2003 | Stein et al. |
| 2003/0022675 A1 | 1/2003 | Mergler |
| 2003/0026225 A1 | 2/2003 | Ogino et al. |
| 2003/0096622 A1* | 5/2003 | Moilanen ...................... 455/456 |
| 2003/0125044 A1 | 7/2003 | Deloach et al. |
| 2003/0125046 A1* | 7/2003 | Riley et al. ................... 455/456 |
| 2003/0144006 A1 | 7/2003 | Johansson et al. |
| 2003/0157943 A1 | 8/2003 | Sabat, Jr. |
| 2003/0176196 A1 | 9/2003 | Hall et al. |
| 2003/0203738 A1 | 10/2003 | Brown et al. |
| 2003/0210142 A1* | 11/2003 | Freathy et al. ........... 340/539.13 |
| 2003/0210656 A1 | 11/2003 | Biacs et al. |
| 2003/0220105 A1* | 11/2003 | Daigremont et al. ......... 455/424 |
| 2003/0234741 A1 | 12/2003 | Rogers et al. |
| 2003/0235172 A1 | 12/2003 | Wood |
| 2004/0002346 A1 | 1/2004 | Santhoff |
| 2004/0043765 A1* | 3/2004 | Tolhurst ...................... 455/422.1 |
| 2004/0127229 A1 | 7/2004 | Ishii |
| 2004/0142702 A1* | 7/2004 | Hefner et al. ............... 455/456.1 |
| 2004/0162090 A1* | 8/2004 | Suryanarayana et al. . 455/456.5 |
| 2004/0185881 A1* | 9/2004 | Lee et al. ...................... 455/466 |
| 2004/0203567 A1 | 10/2004 | Berger |
| 2004/0203904 A1* | 10/2004 | Gwon et al. ................ 455/456.1 |
| 2004/0203912 A1* | 10/2004 | Budka et al. ................ 455/456.1 |
| 2004/0203926 A1* | 10/2004 | Ruutu et al. ................ 455/456.1 |
| 2004/0258012 A1 | 12/2004 | Ishii |
| 2004/0259546 A1 | 12/2004 | Balachandran et al. |
| 2005/0014497 A1* | 1/2005 | Goren ........................... 455/423 |
| 2005/0020309 A1 | 1/2005 | Moeglein et al. |
| 2005/0037775 A1 | 2/2005 | Moeglein et al. |
| 2005/0043038 A1* | 2/2005 | Maanoja et al. ............ 455/456.1 |
| 2005/0064877 A1 | 3/2005 | Gum et al. |
| 2005/0090266 A1 | 4/2005 | Sheynblat |
| 2005/0113090 A1* | 5/2005 | Sharony ........................ 455/436 |
| 2005/0124355 A1 | 6/2005 | Cromer et al. |
| 2005/0125493 A1* | 6/2005 | Chaskar et al. ............... 709/203 |
| 2005/0153687 A1 | 7/2005 | Niemenmaa et al. |
| 2005/0181805 A1* | 8/2005 | Gallagher .................. 455/456.1 |
| 2005/0181810 A1* | 8/2005 | Camp et al. ................ 455/456.6 |
| 2005/0197137 A1 | 9/2005 | Radic et al. |
| 2005/0227689 A1 | 10/2005 | Jewett |
| 2005/0227705 A1* | 10/2005 | Rousu et al. ............... 455/456.1 |
| 2005/0227707 A1* | 10/2005 | Law et al. .................. 455/456.1 |
| 2005/0232189 A1 | 10/2005 | Loushine |
| 2005/0246334 A1* | 11/2005 | Tao et al. ......................... 707/5 |
| 2005/0250516 A1 | 11/2005 | Shim |
| 2006/0009235 A1 | 1/2006 | Sheynblat et al. |
| 2006/0245406 A1 | 11/2006 | Shim |
| 2007/0001867 A1 | 1/2007 | Rowe et al. |
| 2007/0002813 A1 | 1/2007 | Tenny et al. |
| 2007/0037586 A1 | 2/2007 | Kim et al. |
| 2007/0140163 A1 | 6/2007 | Meier et al. |
| 2007/0270168 A1 | 11/2007 | Sheynblat |
| 2008/0123608 A1 | 5/2008 | Edge et al. |
| 2009/0104904 A1 | 4/2009 | Shim |
| 2012/0115508 A1 | 5/2012 | Moeglein et al. |
| 2013/0095850 A1 | 4/2013 | Sheynblat |

FOREIGN PATENT DOCUMENTS

| | | |
|---|---|---|
| CN | 1373371 A | 10/2002 |
| CN | 1413058 | 4/2003 |
| DE | 10142954 | 4/2003 |
| EP | 0933961 | 8/1999 |
| EP | 1215928 | 6/2002 |
| EP | 1289320 | 3/2003 |
| EP | 1387590 A2 | 2/2004 |
| JP | 6148308 A | 5/1994 |
| JP | 10213644 | 8/1998 |
| JP | 2000156881 | 6/2000 |
| JP | 2001500256 | 1/2001 |
| JP | 2001305210 | 10/2001 |
| JP | 2001333184 | 11/2001 |
| JP | 2002077965 | 3/2002 |
| JP | 2002510893 | 4/2002 |

(56) References Cited

FOREIGN PATENT DOCUMENTS

| | | |
|---|---|---|
| JP | 2002195846 A | 7/2002 |
| JP | 2002236163 A | 8/2002 |
| JP | 2003014488 A | 1/2003 |
| JP | 2003023384 A | 1/2003 |
| JP | 2003047045 | 2/2003 |
| JP | 2003152633 | 5/2003 |
| JP | 2003520532 A | 7/2003 |
| JP | 2003319443 | 11/2003 |
| JP | 2004040775 | 2/2004 |
| JP | 2004086349 A | 3/2004 |
| JP | 2004129026 A | 4/2004 |
| JP | 2005195429 | 7/2005 |
| JP | 2005525003 A | 8/2005 |
| JP | 2005525016 | 8/2005 |
| JP | 2005536110 A | 11/2005 |
| JP | 2005536944 A | 12/2005 |
| JP | 2007518979 T | 7/2007 |
| JP | 2007520915 A | 7/2007 |
| JP | 2007525093 | 8/2007 |
| JP | 2007525094 T | 8/2007 |
| JP | 2011019226 | 1/2011 |
| KR | 19980702271 | 7/1998 |
| KR | 19990047966 | 7/1999 |
| KR | 20000022270 A | 4/2000 |
| KR | 20010071208 | 7/2001 |
| KR | 20010087969 A | 9/2001 |
| KR | 20020073167 | 9/2002 |
| KR | 20030011866 | 2/2003 |
| KR | 20030052838 A | 6/2003 |
| KR | 20030079972 | 10/2003 |
| KR | 20050098901 | 10/2005 |
| RU | 2001531 C1 | 10/1993 |
| RU | 2163053 C2 | 2/2001 |
| WO | WO9307684 A1 | 4/1993 |
| WO | WO9810306 A1 | 3/1998 |
| WO | WO99057576 | 11/1999 |
| WO | WO0027143 A1 | 5/2000 |
| WO | WO-0133302 A2 | 5/2001 |
| WO | WO-0154422 A2 | 7/2001 |
| WO | WO0221873 A1 | 3/2002 |
| WO | WO-0246788 A2 | 6/2002 |
| WO | WO-02071781 A1 | 9/2002 |
| WO | WO02079797 A1 | 10/2002 |
| WO | WO03010552 | 2/2003 |
| WO | 03021851 A2 | 3/2003 |
| WO | WO-03021286 A2 | 3/2003 |
| WO | WO03058985 | 7/2003 |
| WO | WO 03058985 A2 * | 7/2003 |
| WO | WO03058986 | 7/2003 |
| WO | WO-03065740 A2 | 8/2003 |
| WO | 03094564 A1 | 11/2003 |
| WO | WO03094285 A2 | 11/2003 |
| WO | 2004016032 | 2/2004 |
| WO | WO2004017092 A1 | 2/2004 |
| WO | WO2004019559 | 3/2004 |
| WO | WO 2004019559 A2 * | 3/2004 |
| WO | WO2004032561 | 4/2004 |
| WO | WO2004045110 | 5/2004 |
| WO | WO2004106964 | 12/2004 |
| WO | 2005/004527 A1 | 1/2005 |
| WO | WO2005004527 | 1/2005 |
| WO | WO2005004528 | 1/2005 |
| WO | WO2005027393 | 3/2005 |
| WO | WO2005029120 | 3/2005 |
| WO | 2005046254 A2 | 5/2005 |
| WO | 2005065320 A2 | 7/2005 |
| WO | WO2005089384 | 9/2005 |
| WO | WO 2005106523 A1 * | 11/2005 |
| WO | WO2006029277 | 3/2006 |

OTHER PUBLICATIONS

International Search Report, PCT/US2006/060632, International Search Authority/EPO, Jul. 9, 2007 (2 pages).

3rd Generation Partnership Project 2 "3GPP2": "cdma2000 Packet Data Services; Wireless Local Area Network (WLAN) Inter-working," 3GPP2 X.S0028-000-0, Version 1.0, pp. 1-119 (Jul. 2006).
3rd Generation Partnership Project 2 "3GPP2": "Position Determination Service Standard for Dual Mode Spread Spectrum Systems," 3GPP2 C.S0022-0, Version 3.0, pp. 1-146 (Feb. 2001).
3rd Generation Partnership Project 2 "3GPP2": "TIA/EIA-41-D Location Services Enhancements," 3GPP2 X.S0002, Version 1.0.0, pp. 1-234 (Mar. 2004).
3rd Generation Partnership Project; Technical Specificatiln Group GSM/EDGE Radio Access Network, "Generic access to A/Gb interface; Stage 2 (Release 6)," 3GPP TS 43.318 V6.8.0, pp. 1-71 (Nov. 2006).
3rd Generation Partnership Project; Technical Specification Group GSM/EDGE Radio Access Network, "Functional stage 2 description of Location Services (LCS) in GERAN (Release 4)," 3GPP TS 43.059 V4.7.0, pp. 1-50 (Apr. 2006).
3rd Generation Partnership Project; Technical Specification Group Radio Access Network, "Stage 2 functional specification of User Equipment (UE) positioning in UTRAN (Release 7)," 3GPP TS 25.305 V7.3.0, pp. 1-79 (Jun. 2006).
3rd Generation Partnership Project; Technical Specification Group Services and System Aspects, "3GPP system to Wireless Local Area Network (WLAN) interworking; System description (Release 6)," 3GPP TS 23.234 V6.10.0, pp. 1-75 (Sep. 2006).
3rd Generation Partnership Project; Technical Specification Group Services and System Aspects, "Functional stage 2 description of Location Services (LCS)(Release 7)," 3GPP TS 23.271 V7.6.0, pp. 1-141 (Sep. 2006).
Joint Standard, "Enhanced Wireless 9-1-1 Phase II (Erratum)," J-STD-036-B, pp. 1-344 (Jun. 2006).
Open Mobile Alliance, "Secure User Plane Location Architecture," Candidate Version 1.0, pp. 1-80 (Jan. 2006).
Position Determination Service for cdma2000 Spread Spectrum Systems, TIA-801-A (Revision of TIA/EIA/IS-801) pp. 1-296 (Apr. 2004).
TIA/EIA-41-D Location Services Enhancements, TIA-881, pp. 1-238 (Mar. 2004).
Universal Mobile Telecommunications System (UMTS); Radio Resource Control (RRC); Protocol specification (3GPP TS 25.331 version 5.18.0 Release 5) ETSI TS 125 331 V5.18.0, pp. 1-1047 (Sep. 2006).
International Preliminary Report on Patentability, PCT/US2006/060632—The International Bureau of WIPO—Geneva, Switzerland, May 7, 2008.
Written Opinion, PCT/US2006/060632—International Search Authority—European Patent Office, Jul. 9, 2007.
3GPP2 C.S0022-01-1, Publication Version, "3rd Generation Partnership Project 2 (#GPP2). Position Determination Service Standard for Dual Spread Spectrum Systems," Addendum (TIA/EIA/IS-801-1). Feb. 16, 2001.
International Search Report, PCT/US06/033268, International Search Authority—Euopean Patent Office, Feb. 13, 2007.
International Search Report—PCT/US04/020920, International Search Authority—European Patent Office, Nov. 22, 2004.
International Search Report—PCT/US04/020921, International Search Authority—European Patent Office, Nov. 22, 2004.
International Search Report—PCT/US05/032018, International Search Authority—European Patent Office; Jan. 17, 2006.
European Search Report—EP10187475—Search Authority—Munich—May 25, 2012.
Orville, "Development of the National Lightning Detection Network," BAMS, Feb. 2008, 11 pages.
Translation of Office Action in Korean application 10-2005-7024968 corresponding to U.S. Appl. No. 10/877,205, citing US6236365 and KR20010071208 dated Jan. 17, 2011.
Translation of Office Action in Korean application 2010-7013139 corresponding to U.S. Appl. No. 11/557,451, citing KR20050098901 and US20050153687 dated Feb. 24, 2011.
European Search Report—EP10187475—Search Authority—Munich—Nov. 30, 2012.
Kikuchi T, "What's New, Not Worse Than Wired, Nikkei Electronics," Japan, Nikkei Business Publications, Inc., Mar. 31, 2003, No. 844, pp. 30-31.
Suzuki Y, "Technologies of Internet Access Communication," Information Processing, Japan, The Information Processing Society of Japan, Apr. 2002, vol. 43, No. 4, pp. 462-467.

* cited by examiner

POSITIONING FOR WLANS AND OTHER WIRELESS NETWORKS

The present application claims priority to provisional U.S. Application Ser. No. 60/734,631, entitled "LOCATION SOLUTIONS APPLICABLE TO WIRELESS LOCAL AREA NETWORKS (WLANs)," filed Nov. 7, 2005, provisional U.S. Application Ser. No. 60/748,225, entitled "LOCATION SOLUTION APPLICABLE TO A TERMINAL SERVED BY A WIRELESS LAN," filed Dec. 6, 2005, and provisional U.S. Application Ser. No. 60/856,684, entitled "Support for WLAN Positioning in SUPL," filed Nov. 4, 2006, all assigned to the assignee hereof and incorporated herein by reference.

BACKGROUND

1. Field

The present disclosure relates generally to communication, and more specifically to techniques for performing positioning.

2. Background

Wireless communication networks are widely deployed to provide various communication services such as voice, video, packet data, messaging, broadcast, etc. These wireless networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, and Orthogonal FDMA (OFDMA) networks.

It is often desirable, and sometimes necessary, to know the location of a terminal in a wireless network. The terms "location" and "position" are synonymous and are used interchangeably herein. For example, a user may utilize the terminal to browse through a website and may click on location sensitive content. The location of the terminal may then be determined and used to provide appropriate content to the user. There are many other scenarios in which knowledge of the location of the terminal is useful or necessary.

Some wireless networks such as CDMA networks can readily support positioning. These wireless networks may have many base stations that transmit signals encoded with timing information. The location of a terminal may be determined based on timing measurements for a sufficient number of base stations and known fixed locations of these base stations. In some wireless networks, the locations of the transmitters may not be known or there may be uncertainty in the transmitter locations. Nevertheless, it may be desirable to determine the location of a terminal in such a wireless network.

SUMMARY

Techniques for positioning access points and terminals in wireless local area networks (WLANs) as well as other wireless networks are described herein. Positioning refers to a process to measure/compute a geographic location estimate of a target device. A location estimate may also be referred to as a position estimate, a position fix, etc.

In one aspect, for access point positioning, measurements are obtained for at least one access point in a WLAN. The measurements may be based on transmission sequences (e.g., beacon frames) transmitted periodically by each access point. The measurements may be made by multiple terminals at different locations or a single mobile terminal at different locations. The location of each access point is determined based on the measurements and known locations of the terminal(s) and further in accordance with a positioning method, e.g., a round trip time (RTT) method, an observed time difference (OTD) method, a time of arrival (TOA) method, etc.

In another aspect, at least one location of at least one terminal receiving transmissions from an access point is obtained. The location of the access point is determined based on the at least one location of the at least one terminal and possibly additional information such as range limit of the radio technology used by the WLAN, transmit power used by the at least one terminal or the access point, etc.

In yet another aspect, for terminal positioning, measurements for at least one access point in a WLAN are obtained. The location of the terminal is determined based on the measurements and at least one location of the at least one access point and further in accordance with a positioning method, e.g., the RTT method, OTD method, TOA method, signal strength/quality method, access point identity (AP ID) method, etc.

In yet another aspect, a plurality of location results (e.g., probability density functions) is obtained for a plurality of positioning methods. The location results are combined to obtain a final location result (e.g., a final probability density function). A location estimate for a station is obtained based on the final location result.

Various aspects and features of the disclosure are described in further detail below.

DETAILED DESCRIPTION

Techniques for supporting positioning in wireless networks are described herein. The techniques may be used for various wireless networks such as wireless local area networks (WLANs), wireless wide area networks (WWANs), metropolitan area networks (WMANs), broadcast networks, etc. The terms "network" and "system" are often used interchangeably. A WWAN is a wireless network that provides communication coverage for a large geographic area such as, e.g., a city, a state, or an entire country. A WWAN may be a cellular network such as a CDMA network, a TDMA network, an FDMA network, an OFDMA network, etc. A CDMA network may implement a radio technology such as Wideband-CDMA (W-CDMA), cdma2000, etc. cdma2000 covers IS-2000, IS-95, and IS-856 standards. A TDMA network may implement a radio technology such as Global System for Mobile Communications (GSM), Digital Advanced Mobile Phone System (D-AMPS), etc. D-AMPS covers IS-248 and IS-54. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

A WLAN is a wireless network that provides communication coverage for a small or medium geographic area such as, e.g., a building, a mall, a coffee shop, an airport terminal, a school, hospital etc. A WLAN may implement a radio technology such as any defined by IEEE 802.11, Hiperlan, etc. A WMAN may implement a radio technology such as any defined by IEEE 802.16. IEEE 802.11 and IEEE 802.16 are two families of standards from The Institute of Electrical and Electronics Engineers (IEEE). The IEEE 802.11 family includes 802.11a, 802.11b, 802.11g and 802.11n standards and is commonly referred to as Wi-Fi. Each IEEE 802.11 standard specifies operation in a specific frequency band (e.g., 2.4 GHz or 5 GHz) using one or more modulation techniques. The IEEE 802.16 family includes 802.16e standard and is commonly referred to as WiMAX. Hiperlan is a WLAN technology that is commonly used in Europe. For clarity, much of the following description is for a WLAN.

Figure 1:
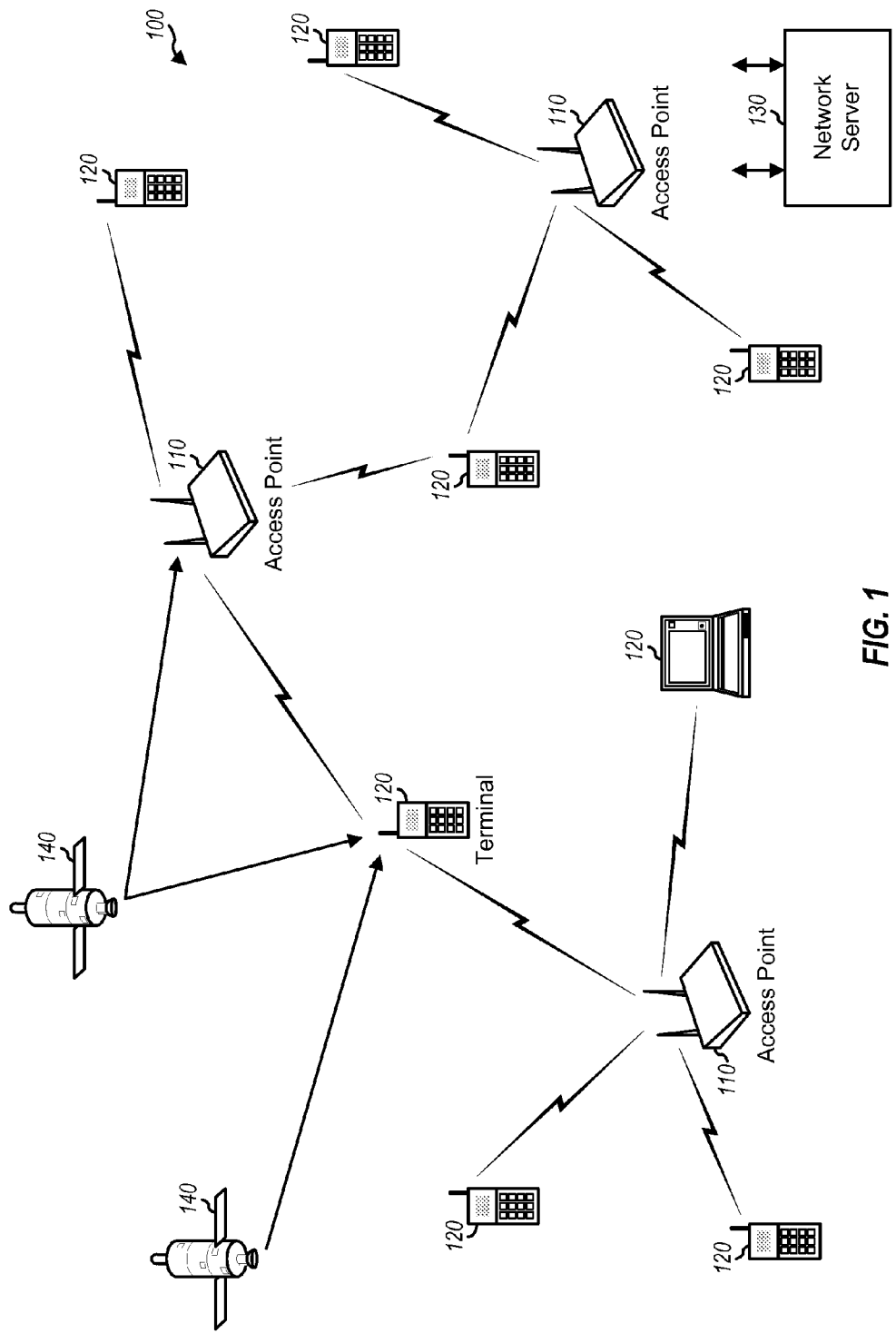
FIG. 1 shows a WLAN that supports positioning.

FIG. 1 shows a WLAN 100 that supports positioning. WLAN 100 includes access points (AP) 110 that communicate with terminals 120. An access point is a station that supports communication for terminals associated with that access point. An access point may also be referred to as a base station. For WMAN and WWAN wireless technologies, an access point may be replaced by a Node B, an enhanced Node B (eNode B), a base transceiver subsystem, etc. Access points 110 may directly or indirectly couple to a network server 130 that may perform various functions for positioning. Network server 130 may be a single network entity or a collection of network entities. In general, a WLAN may include any number of access points. Each access point may be identified by an access point identity (AP ID), which may be a globally unique Medium Access Control (MAC) address that is included in frames transmitted by the access point, an Internet Protocol (IP) address, etc.

A terminal is a station that can communicate with another station via a wireless medium. A terminal may be stationary or mobile and may also be referred to as a mobile station, a user equipment, a subscriber station, etc. A terminal may be a cellular phone, a personal digital assistant (PDA), a handheld device, a wireless device, a laptop computer, a wireless modem, a cordless phone, a telemetry device, a tracking device, etc.

An access point or a terminal may also receive signals from satellites 140, which may be part of the United States Global Positioning System (GPS), the European Galileo system, the Russian Glonass system, or some other satellite positioning system (SPS). A terminal may measure signals from access points 110 and/or signals from satellites 140. The measurements may be used to determine the location of the terminal and/or access points, as described below.

In general, a WLAN and/or its associated terminals may support any number of positioning methods and any positioning method. Table 1 lists some positioning methods that may be supported by a WLAN and/or its associated terminals and provides a short description for each method.

TABLE 1

| Positioning Method | Description |
| --- | --- |
| AP ID | Solution based on identities of access points. |
| RTT | Solution based on round trip time (RTT) measurements. |
| OTD | Solution based on observed time difference (OTD) measurements. |
| TOA | Solution based on time of arrival (TOA) measurements. |
| Signal strength/quality | Solution based on signal strength and/or signal quality measurements. |
| Cell ID for A-GPS | Solution based on cell ID and used for assisted GPS (A-GPS). |

In the following description, the term "GPS" generically refers to positioning based on any satellite positioning system, e.g., GPS, Galileo, etc. The term "A-GPS" generically refers to positioning based on any satellite positioning system with assistance data.

The positioning methods may be used to (a) determine the locations of terminals based on known locations of access points and/or (b) determine the locations of access points based on known locations of terminals. The known locations may be obtained independently with GPS, A-GPS, etc. The ability to determine access point locations based on terminal locations may be highly desirable since numerous WLANs are currently deployed, WLANs are not always publicly known, and access points may be moved (i.e., are not always fixed). The locations of access points may be determined and/or updated based on terminals supporting independent positioning methods such as GPS, A-GPS, etc. The access point locations may be used to determine the locations of terminals that do not support independent positioning methods such as GPS, A-GPS, etc.

The various positioning methods may be supported by the terminals and/or by employing a network server, e.g., network server 130 in FIG. 1 or one of access points 110. The network server may instruct terminals to provide measurements and may compute location estimates for the terminals and/or access points. The network server may also store location information for the terminals and/or access points and may use the location information to support positioning.

1. AP ID Method

The AP ID method utilizes known locations of access points in a WLAN to determine locations of terminals. A location may be given by 2-dimensional (x, y) or 3-dimensional (x, y, z) geographic coordinates. The locations of the access points may be determined in various manners. In one scheme, the location of an access point may be determined by a WLAN operator by surveying, using map association, etc. In another scheme, the location of an access point may be determined based on a positioning method such as GPS, A-GPS, etc.

Figure 2A:
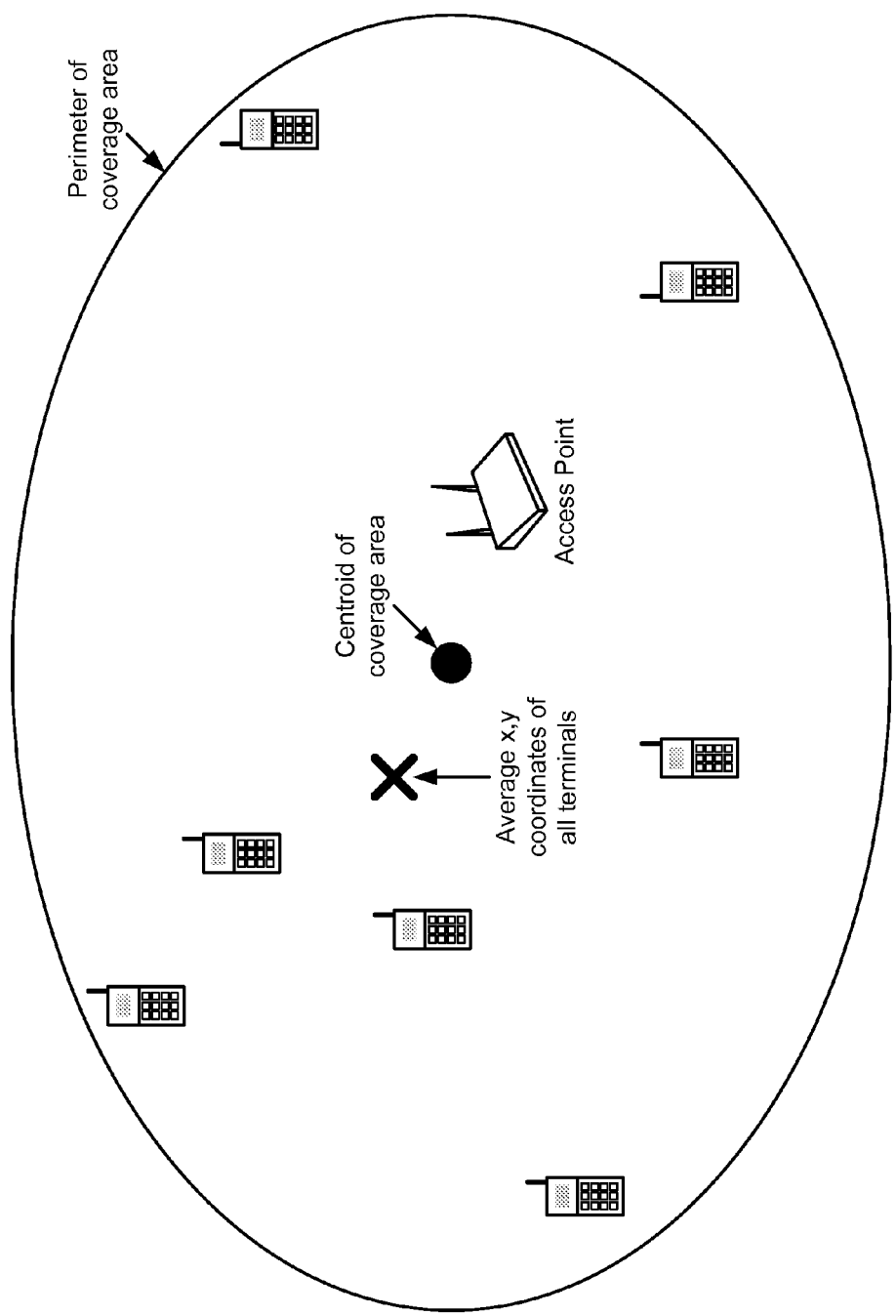
FIGS. 2A and 2B show positioning of an access point.

FIG. 2A shows a scheme for positioning an access point based on known locations of one or more terminals communicating with the access point. A coverage area for the access point may be determined based on the known locations of different terminals and/or different known locations of the same terminals. The location of the access point may be determined based on all known terminal locations, e.g., an average latitude (x) coordinate and an average longitude (y) coordinate for the terminal locations. To avoid bias due to greater density of terminals in one area than other areas, the perimeter of the coverage area may be determined based on the outermost terminal locations. The location of the access point may then be given by a point within the area enclosed by the perimeter, e.g., the centroid of the enclosed area.

Figure 2B:
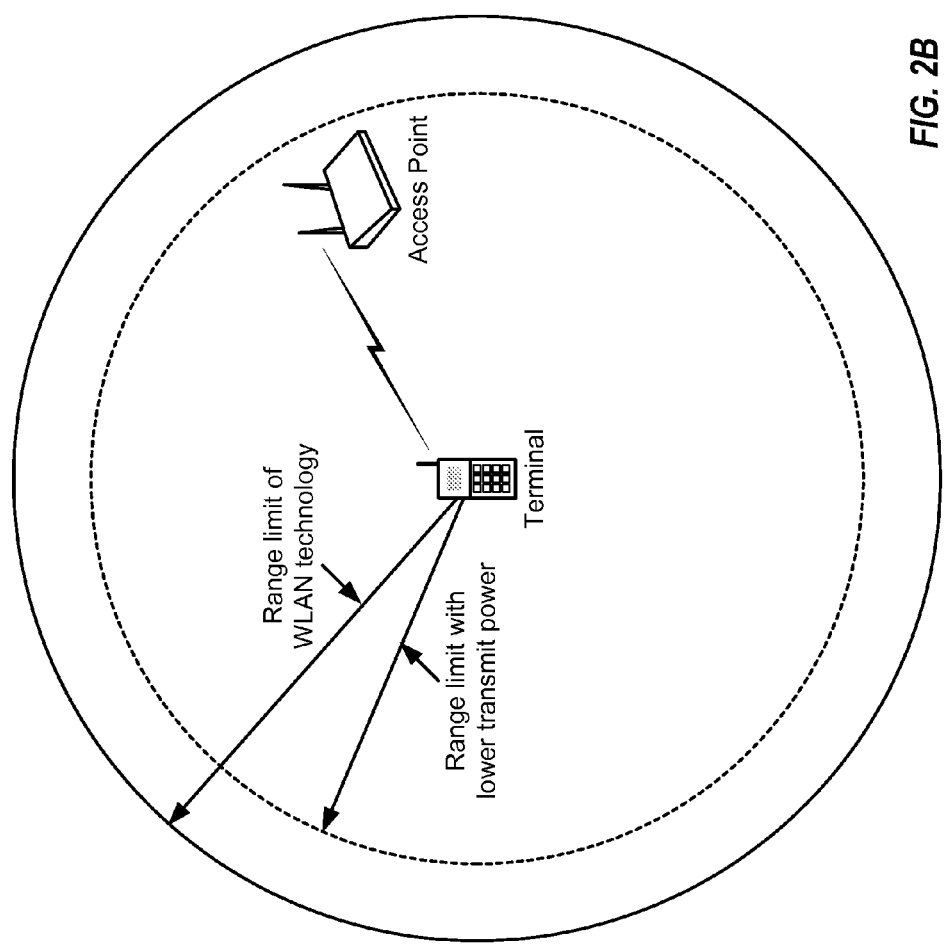

FIG. 2B shows a scheme for positioning an access point based on known location of a single terminal. The location of the terminal may be provided as an approximate location of the access point. This approximate location has an error or uncertainty that is dependent on the coverage range of the access point. If the WLAN technology is known (e.g., 802.11b, 802.11g, etc.), then the maximum distance from the terminal to the access point may be estimated based on the range limitation of the WLAN technology. For example, many 802.11 technologies generally have range limits of around 50 to 100 meters. The location of the access point may then be approximated by the terminal location with the actual access point location lying within a circle centered at the terminal location and having a radius given by the range limit. The range limit is typically given for the maximum transmit power allowed by the WLAN technology. Hence, a smaller radius (and thus less uncertainty) may be used for the circle if it is known that the access point or the terminal used less than the maximum transmit power for communication.

In general, the location of an access point may be determined in advance (e.g., through cartography or surveying) or in the field by applying any of the positioning methods in reverse. In particular, the access point location may be determined based on one or more known locations of one or more terminals supporting reliable and accurate positioning methods such as GPS, A-GPS, etc.

The AP ID method can provide a location estimate for a terminal based on an identity of an access point serving or received by the terminal and the known location of the access point. The location of the access point may be provided as the location estimate for the terminal. This location estimate has an uncertainty determined by the coverage range of the access point, which may be estimated based on the WLAN technology as described above. The accuracy of the location estimate may then be dependent on the range limit of the WLAN technology. The location estimate may be fairly accurate for WLAN technologies with limited coverage (e.g., up to 50 meters for some IEEE 802.11 technologies) and less accurate for WLAN, WMAN and WWAN technologies with extended range or where repeaters are used to extend coverage.

The location of an access point may be made available to terminals within the coverage area and/or in other networks. For example, in an IEEE 802.11 WLAN, the access point may include its location in a beacon that is broadcast periodically to the terminals. In this case, terminals that can receive the beacon may be able to estimate their locations based on the access point location obtained from the beacon.

2. RTT Method

The RTT method provides a location estimate for a station based on RTT measurements for one or more other stations and known locations of the other stations. For example, a terminal may measure the round trip time for radio signal propagation between the terminal and one or more access points. The location of the terminal may then be determined based on the RTT measurements and known locations of the access points using triangulation techniques.

RTT measurements may be made in various manners. For example, in IEEE 802.11v, a terminal sends a message (e.g., a Presence Request frame) to an access point and receives an acknowledgment (e.g., a Presence Response frame) from the access point. The acknowledgment may contain the time delay measured by the access point between the receive time of the last part (e.g., the final bit or chip) of the terminal's message and the transmit time of the first part (e.g., the first bit or chip) of the acknowledgment. The terminal may measure the time delay between the transmit time of the last part of the message and the receive time of the first part of the acknowledgment. The terminal may then subtract the time delay reported by the access point from the time delay measured by the terminal to obtain a measurement of RTT. Other schemes may also be used to measure the time difference between sending a given message and receiving a response.

The location of an access point may be determined by obtaining RTT measurements for one or more terminals with known locations and applying triangulation in reverse. In this case, for each terminal with known location, the RTT to the access point may be measured by the terminal or the access point. The location of the access point may then be obtained based on the RTT measurements made by the same or different terminals at different known locations using triangulation.

In general, a location estimate for a station (e.g., a terminal or an access point) may be obtained with the RTT method based on location-related measurements obtained for one or more other stations. A location estimate obtained with the RTT method may be much more accurate than a location estimate obtained with the AP ID method. The RTT method attempts to pinpoint the location of the station whereas the AP ID method estimates the location of the station over an entire coverage area.

3. OTD Method

The OTD method provides a location estimate for a station based on OTD measurements for other stations and known locations of the other stations. For example, a terminal may measure the observed transmission timing difference between pairs of access points. These measurements may be based on transmissions containing implicit or explicit timing information from the access points. These transmissions may correspond to beacon frames broadcast periodically by access points in IEEE 802.11 WLAN. The location of the terminal may then be obtained based on these measurements using trilateration.

Figure 3:
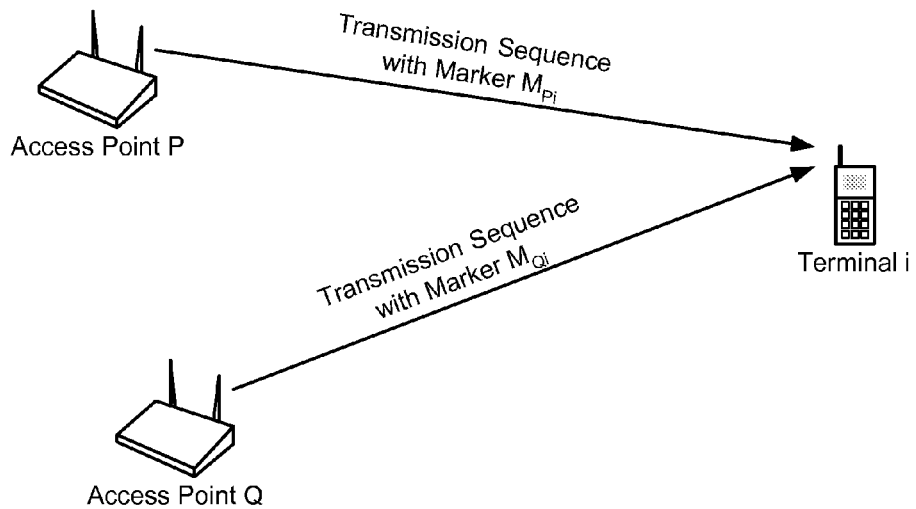
FIG. 3 shows OTD measurement by a terminal for two access points.

FIG. 3 shows OTD measurement by a terminal i for two access points P and Q. Each access point transmits a series of transmission sequences, e.g., sequences of binary encoded data. Each transmission sequence contains implicit or explicit relative time reference. Access points P and Q may transmit their transmission sequences periodically at fixed repetition intervals of $T_P$ and $T_Q$, respectively. The duration of each transmission sequence may be equal to or less than the repetition interval. The transmission sequences are regularly repeating in that an identifiable information structure is regularly repeated, although the repeated structure may or may not contain repeated information. For example, each transmission sequence may correspond to a beacon frame in IEEE 802.11.

Access points P and Q may have relatively accurate and stable clocks but are typically not synchronized. Hence, the exact times at which the transmission sequences are sent may not be known. Each transmission sequence contains a marker that may be used as a time reference. The marker in a transmission sequence from access point P is denoted as $M_P$, and the marker in a transmission sequence from access point Q is denoted as $M_Q$. Markers $M_P$ and $M_Q$ may be the beginning, the end, or a point in the middle of their respective transmission sequences.

Terminal i receives two transmission sequences from access points P and Q and identifies the markers in the received transmission sequences. The two markers received by terminal i from access points P and Q are denoted as $M_{Pi}$ and $M_{Qi}$, respectively. Terminal i measures the difference between the arrival time of marker $M_{Pi}$ from access point P and the arrival time of marker $M_{Qi}$ from access point Q. This arrival time difference is denoted as $OTD_i$.

The real time difference between markers $M_{Pi}$ and $M_{Qi}$ is denoted as $RTD_i$ and is the difference between the absolute transmit times of these markers from access points P and Q. $RTD_i$ is equal to $OTD_i$ if terminal i is equidistant between access points P and Q. Otherwise, $RTD_i$ and $OTD_i$ are related to the distances between terminal i and access points P and Q and may be expressed as:

$$OTD_i = A(M_{Pi}) - A(M_{Qi}), \quad \text{Eq (1)}$$

$$RTD_i = T(M_{Pi}) - T(M_{Qi}), \quad \text{Eq (2)}$$

where $T(M_{ki})$ is the absolute transmit time of marker $M_{ki}$ from access point k, for k=P or Q, and $A(M_{ki})$ is the absolute arrival time of marker $M_{ki}$ at terminal i.

Equations (1) and (2) may be combined as follows:

$$OTD_i - RTD_i = \{A(M_{Pi}) - T(M_{Pi})\} - \{A(M_{Qi}) - T(M_{Qi})\} \quad \text{Eq (3)}$$

$$= \frac{D_{Pi} - D_{Qi}}{c}$$

$$= \frac{\sqrt{(x_i - x_P)^2 + (y_i - y_P)^2} - \sqrt{(x_i - x_Q)^2 + (y_i - y_Q)^2}}{c}$$

where $D_{ki}$ is the distance between terminal i and access point k, $(x_k, y_k)$ are horizontal x, y coordinates of access point k location, $(x_i, y_i)$ are horizontal x, y coordinates of terminal i location, and c is signal propagation speed, e.g., the speed of light.

For simplicity, vertical coordinates are ignored in equation (3) but may be easily added as will be evident to those skilled in the art. In equation (3), $OTD_i$ may be measured by terminal i, and all other variables are either known or can be solved for. For example, the coordinates of terminal i may be obtained independently using GPS, A-GPS, etc. In this case, equation (3) would contain five unknown variables—the x and y coordinates for each of the two access points and the RTD between markers $M_{Pi}$ and $M_{Qi}$. Five OTD measurements for the same markers $M_{Pi}$ and $M_{Qi}$ may be made by five different terminals at different known locations and used to solve for the five unknown variables. Alternatively, five OTD measurements may be made by a single terminal at five different known locations and used to solve for the five unknown variables. Hence, the unknown x, y coordinates of the two access points may be obtained based on five OTD measurements from one or more terminals at different known locations.

OTD measurements are typically not obtained for the same markers by different terminals. Instead, different terminals typically make OTD measurements at different times based on different markers in different transmission sequences. A single terminal that is mobile may also make OTD measurements for different markers at different times while in different locations. In any case, the RTDs of the markers used for different OTD measurements made at different times may not all be the same.

For OTD measurements made by different terminals, the RTDs applicable to any two terminals i and j, for i≠j, are related as follows.

$$RTD_i - RTD_j = \{T(M_{Pi}) - T(M_{Qi})\} - \{T(M_{Pj}) - T(M_{Qj})\} \quad \text{Eq (4)}$$

$$= \{T(M_{Pi}) - T(M_{Pj})\} - \{T(M_{Qi}) - T(M_{Qi})\}$$

where $RTD_i - RTD_j$ is the RTD difference for terminals i and j, and $T(M_{ki}) - T(M_{kj})$ is the time interval between two markers from access point k.

Equation (4) indicates that the RTD difference for terminals i and k may be obtained based on the time interval between two different markers from each of the two access points. The time interval for each access point may be determined if the two markers occur in the same transmission sequence and their times of occurrence in the transmission sequence are known. The time interval for each access point may also be determined if the two markers occur in different transmission sequences if (a) the interval of time from the beginning of each transmission sequence to the respective marker is known and (b) the time interval between the beginnings of the two transmission sequences is known. Condition (b) may be satisfied when the repetition interval $T_k$ between consecutive transmission sequences is known and each transmission sequence carries a sequence number. If the transmission sequences are numbered, then the number of sequences from the sequence containing the first marker to the sequence containing the second marker may be counted. If the transmission sequences are not numbered, then there may be ambiguity in the value of the RTD difference in equation (4). This ambiguity is of the form $p^*T_P + q^*T_Q$, where $T_P$ and $T_Q$ are the repetition intervals for access points P and Q, respectively, and p and q may be positive or negative integer values corresponding to the unknown number of sequences between the markers from access points P and Q, respectively. If the repetition interval is the same for both access points, or $T_P = T_Q$, and is large compared to the maximum value of the right hand side of equation (3) (so that the propagation delay to any terminal is much less than the repetition interval), then the ambiguity in the RTD difference disappears since only one value for the uncertainty $(p+q)^*T_P$ will provide a solution to equation (3).

Knowing the difference between any pair of RTDs allows for use of equation (3) to solve for one unknown RTD plus four unknown x and y coordinates for two access points with five OTD measurements. The RTD for one OTD measurement may be expressed as an unknown variable X. The RTD for each remaining OTD measurement may be expressed as X+K, where K may be determined from equation (4).

The access points should send their transmission sequences with good timing/frequency precision and stability in order to allow for accurate OTD measurements by the terminals. The transmission sequences from a pair of access points may drift over time due to clock imprecision in one or both access points. In this case, the RTD between the markers from the pair of access points would vary with time. The RTD for two markers transmitted from two access points P and Q at time t may be given as:

$$RTD(t) = a_n \cdot t^n + a_{n-1} \cdot t^{n-1} + \ldots + a_1 \cdot t^1 + a_0, \quad \text{Eq (5)}$$

where RTD(t) is the RTD between two markers sent at transmission time t from access
points P and Q, and
$a_i$ is a coefficient, for $0 \leq i \leq n$ and $n > 0$.

For linear drift of RTD, which may be the most common type of drift, $a_i$ would be zero for $i > 1$. For quadratic drift of RTD, $a_i$ would be zero for $i > 2$. Typically, higher coefficients will be zero or almost zero. The number of variables to solve for in equation (3) may be increased by the number of unknown non-zero coefficients in equation (5) in order to account for drift of RTD. The coordinates of the access points may be obtained with the same number of additional OTD measurements from terminals whose locations are known.

Equation (3) may also be used to determine the location of a terminal that obtains OTD measurements for two or more pairs of access points with known locations. In this case, equation (3) would contain three unknown variables—the x and y coordinates for the terminal and the RTD between the markers from the access points. The number of equations may be reduced if the RTD relationships between the access points are known or can be ascertained, e.g., as described above or via some other means. For example, a solution for the coordinates $(x_i, y_i)$ of terminal i may be solved for with two equations for two pairs of access points. These two pairs may be formed with three access points, where one access point is common to both pairs. In the equation for each pair of access points, the coordinates $(x_i, y_i)$ of terminal i may be solved for, the coordinates $(x_P, y_P)$ and $(x_Q, y_Q)$ for access points P and Q in the pair are known, the OTD for these access points may be measured, and RTD for these access points may be known or can be determined.

The OTD method uses measurements of observed transmission timing differences by terminals for pairs of access points. The measurements may be made at the same time, close together in time, or possibly spread across time. The OTD method can determine the locations of access points using OTD measurements from terminals with known locations. The OTD method can also determine the locations of terminals using OTD measurements from the terminals and known locations of access points. A terminal may measure the transmissions from two or more access points if the locations of the access points are being determined and from three or more access points if the location of the terminal is being determined.

An advantage of the OTD method is that access points and WLAN access networks (ANs) do not need to participate in the method. This avoids impacts to existing WLAN implementations and standards. In addition, it is not necessary to have any explicit signaling from the terminals to the access points. Nevertheless, the OTD method may be supported with a network server, e.g., network server 130 in FIG. 1. The network server may instruct a terminal to make OTD measurements and may receive the measurements from the terminal. The network server may perform location-related computations as described above to solve for the terminal locations and/or access point locations using OTD measurements, e.g., as shown in equation (3).

The OTD method may be used for any WLAN technology that sends implicit or explicit timing-related information. The timing-related information may be provided via repeated frame structures, repeated frames, other identifiable information containing a counter or timing-related data, etc. OTD measurements may be made for pairs of access points. The access points in each pair may support the same or different WLAN technologies, as long as the OTD measurement can be related to identifiable markers in the transmission from each access point.

The OTD method may be similar to an Enhanced Observed Time Difference (E-OTD) method for GSM networks, an Observed Time Difference of Arrival (OTDOA) method for W-CDMA networks, and an Advanced Forward Link Trilateration (A-FLT) method for cdma2000 networks. The E-OTD, OTDOA and A-FLT methods only determine the locations of terminals and rely on having knowledge of the locations of base stations. In contrast, the OTD method can determine the locations of terminals as well as access points and may be used for WLAN as well as other wireless networks, e.g., GSM, W-CDMA, and cdma2000 networks.

4. TOA Method

The TOA method provides a location estimate for a station based on TOA measurements for one or more other stations and known locations of the other stations. For example, a terminal may measure the time of arrival for a marker from each of multiple access points and may associate absolute time with each marker. The terminal may obtain absolute time using, e.g., GPS, A-GPS, etc. The location of the terminal may then be obtained based on the measurements using trilateration.

Figure 4:
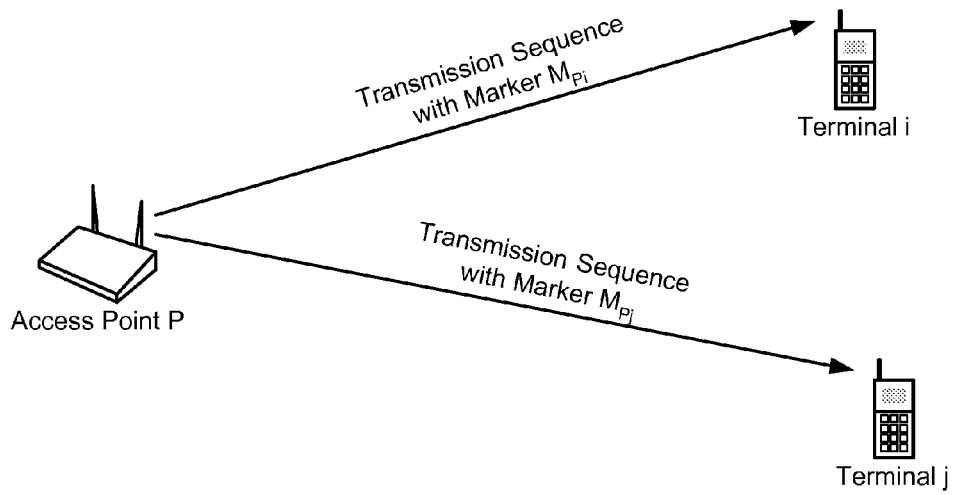
FIG. 4 shows TOA measurements by two terminals for an access point.

FIG. 4 shows TOA measurements by two terminals i and k at different locations for one access point P. Access point P transmits a series of transmission sequences, with each transmission sequence having a marker. Terminal i receives a transmission sequence from access point P. The marker in the sequence received by terminal i is denoted as $M_{Pi}$. Terminal j receives a transmission sequence from access point P. The marker in the sequence received by terminal j is denoted as $M_{Pj}$. Marker $M_{Pi}$ may be the same as or different from marker $M_{Pj}$. Each terminal m, for m=i or j, may determine an absolute arrival time $A(M_{Pm})$ of marker $M_{Pm}$ received by that terminal from access point P based on the terminal's knowledge of absolute time. $A(M_{Pm})$ represents the TOA measurement made by terminal m for access point P.

The OTD between the absolute arrival time of marker $M_{Pi}$ at terminal i and the absolute arrival time of marker $M_{Pj}$ at terminal j is denoted as $OTD_{ij}$. The RTD between the absolute transmit times of markers $M_{Pi}$ and $M_{Pj}$ from access point P is denoted as $RTD_{ij}$. $OTD_{ij}$ and $RTD_{ij}$ may be expressed as:

$$OTD_{ij} = A(M_{Pi}) - A(M_{Pj}), \quad \text{Eq (6)}$$

$$RTD_{ij} = T(M_{Pi}) - T(M_{Pj}), \quad \text{Eq (7)}$$

where $T(M_{Pm})$ is the absolute transmit time of marker $M_{Pm}$ from access point P, and $A(M_{Pm})$ is the absolute arrival time of marker $M_{Pm}$ at terminal m.

Equations (6) and (7) may be combined as follows:

$$OTD_{ij} - RTD_{ij} = \{A(M_{Pi}) - T(M_{Pi})\} - \{A(M_{Pj}) - T(M_{Pj})\} \quad \text{Eq (8)}$$

$$= \frac{D_{Pi} - D_{Pj}}{c}$$

$$= \frac{\sqrt{(x_i - x_P)^2 + (y_i - y_P)^2} - \sqrt{(x_j - x_P)^2 + (y_j - y_P)^2}}{c}$$

where $D_{Pm}$ is the distance between terminal m and access point P, $(x_P, y_P)$ are horizontal x, y coordinates of access point P location, and $(x_m, y_m)$ are horizontal x, y coordinates of terminal m location.

For simplicity, vertical coordinates are ignored in equation (8) but may be easily added as will be evident to those skilled in the art. The absolute arrival times $A(M_{Pi})$ and $A(M_{Pj})$ may be determined by terminals i and j and used to derive $OTD_{ij}$ as shown in equation (6). $RTD_{ij}$ in equation (7) may be readily available since it relates to transmissions from the same access point. $RTD_{ij}$ may be determined based on the repetition interval $T_P$ between consecutive transmission sequences sent by access point P. In equation (8), $OTD_{ij}$ and $RTD_{ij}$ may be available, and all other variables are either known or can be solved for. For example, the coordinates of terminals i and j may be obtained independently using GPS, A-GPS, etc. In this case, equation (8) would contain two unknown variables—the x and y coordinates for access point P. Three TOA measurements by three different terminals at different known locations may be used to form two equations (with one terminal common to both equations), which may then be used to determine the two unknown variables for the x, y coordinates of access point P. Three TOA measurements by a single terminal at different known locations may also be used to determine the coordinates of the access point. The locations of access points determined based on the TOA method may be used to determine the locations of terminals using the RTT, OTD, TOA, or other positioning methods.

The TOA method allows the location of an access point to be determined based on TOA measurements for just that access point. This is desirable in scenarios where a terminal can measure transmissions from only one access point. The TOA method associates arrival time of a marker from the access point with absolute time, e.g. GPS time. The TOA method does not require interaction between terminals and access points.

Equation (8) may also be used in reverse to determine the location of a terminal using known locations of access points. In this case, three or more access points obtain absolute TOA measurements for transmission markers transmitted by the terminal. Equation (8) may be applied with access points now replacing terminals (e.g., terminals i and j) and the terminal replacing the access point (e.g., access point P).

A network server, e.g., network server 130 in FIG. 1, may instruct terminals and/or access points to perform TOA measurements and may receive the measurements from the terminals and/or access points. The network server may then perform location-related computations as described above to determine the locations of the terminals and/or access points.

5. Signal Strength/Quality Method

The signal strength/quality method provides a location estimate for a station based on signal strength and/or signal quality measurements for one or more other stations and known locations of the other stations. The location of the station may be determined using pattern matching, as described below.

A terminal may record the identities of all access points that can be received by the terminal at a particular location. The terminal may also measure the signal strength and/or signal quality for each access point received by the terminal. Signal strength may be quantified by received power and may be given in units of dBm. Signal quality may be quantified by signal-to-noise ratio (SNR), energy-per-bit-to-total-noise ratio (Eb/No), bit error rate (BER), packet error rate (PER), observed signaling errors, etc. Signal quality may be given by a binary value that indicates whether or not the signal quality is above a given threshold, e.g., whether the signal quality is sufficient to decode the AP identity. The location of the terminal may also be obtained using independent means, e.g., GPS, A-GPS, etc. The terminal may report its location, the identities of the received access points, and the signal strength/quality measurement for each access point.

A network server, e.g., network server 130 in FIG. 1, may receive reports from different terminals and/or reports from the same terminals at different locations. The network server may build up a database of access points received at different locations and the associated signal strengths/qualities. A geographic area of interest may be partitioned into small regions or pixels. The regions may have any shape (e.g., squares, rectangles, hexagons, etc.) and may also have any size (e.g., few meters across). The location reported by a terminal may be mapped to a single pixel (e.g., the pixel containing the terminal location coordinates) or to a small set of pixels (e.g., pixels included in a probable area in which the terminal is located). The access point identities and signal strengths/qualities may be associated with the pixel(s) to which the terminal location is mapped. If reports are obtained from multiple terminals for the same pixel or set of pixels, then the measurements in these reports may be combined (e.g., averaged), and the combined measurements may be stored for the pixel(s). For example, signal strengths may be averaged using a moving weighted time average, where the weights may depend on the probability that a given terminal location is correctly mapped to a particular pixel. Signal qualities may also be averaged. For example, if one signal quality threshold is used, then the overall signal quality may relate to the percentage of terminals for which the threshold was exceeded.

The database may be used for positioning of terminals. The network server may obtain from a terminal the identities of access points received by the terminal and possibly signal strengths/qualities for these access points. The network server may search the database for pixels marked with the reported access point identities. The network server may look for partial pattern matches for the access points identified by the terminal and may ignore access points not identified. The network server may then identify pixels associated with averaged signal strengths/qualities that most closely match the reported signal strengths/qualities. The network server may take into account the fact that the sensitivity of different terminals may vary. The result of the search may be a set of pixels, not necessarily contiguous, representing possible locations for the terminal together with the probability that each pixel was in fact the correct location. The network server may derive a single location estimate that minimizes the expected location error (or the root mean square of the error).

The network server may instruct terminals to obtain signal strength/quality measurements and may receive the measurements from these terminals. The network server may build up and/or update the database and perform location-related computations to determine the locations of terminals.

6. Cell ID Method for A-GPS

The A-GPS method provides assistance data to terminals to assist the terminals acquire and measure GPS signals and/or to compute location estimates from the resultant measurements. Assistance data may also be used to support positioning with other satellite positioning systems such as the European Galileo system. An approximate location of a terminal is typically needed in order to provide appropriate assistance data to the terminal. For example, knowledge of the terminal location to within few kilometers is needed to provide acquisition assistance data and GPS-GSM or GPS-WCDMA timing assistance data used to support A-GPS in GSM and W-CDMA networks. Any of the positioning methods described herein may be used to determine the location of the terminal with the required level of accuracy. However, some amount of time is needed to execute one of these position methods and, if successful, the resultant location estimate may be much more accurate than necessary to support A-GPS.

Various positioning methods with fast response time may be capable of delivering coarse location estimates suitable to support A-GPS. For a cell ID method, a terminal obtains globally unique identities of one or more cells in a cellular network such as a GSM, W-CDMA, or cdma2000 network.

The terminal may detect for cells using dual-mode capability and may receive cellular signals (e.g., from GSM, W-CDMA, and/or cdma2000 networks) in parallel with WLAN signals. Alternatively, the terminal may temporarily suspend reception of WLAN signals (e.g., when not needed or not scheduled), switch to cellular operation, scan for cellular signals, and decode the received cellular signals. An access point serving the terminal or a network serving the terminal via the WLAN may also provide the terminal with identities of cells with coverage in the terminal's location. This may be achieved via unsolicited broadcast or point-to-point signaling or in response to a request from the terminal. The cells detected by the terminal may include cells whose coverage included the current location of the terminal and/or cells recently detected by the terminal when near its current location.

The cell identities for current cellular technologies may be globally unique. A cell identity may be mapped to a specific location within a cell, e.g., the location of the cell site antenna. This cell location may be provided as a coarse location estimate for terminals within the cell. The location estimate has an error determined by the size of the cell.

A database may store the locations of cells in one or more cellular networks. The database may be simplified by storing locations of groups of cells, e.g., location areas in GSM or W-CDMA. Cell locations (or the locations of groups of cells) may also be obtained by positioning terminals using other method (e.g., A-GPS, GPS, etc), obtaining the identities of nearby cells from the terminals, and using the locations of the terminals for the cell locations.

A terminal may also provide measurements of timing advance (TA), round trip time, signal strength, signal quality, etc., in addition to cell identity for each detected cell. These measurements may be stored in the database and used to determine the closest cell. The measurements may also be used for the RTT method and the signal strength/quality method to determine the location of the terminal more accurately than with cell identity alone.

A network server may instruct terminals to obtain and report nearby cell identities. The network server may build up and/or update the database by associating the reported cell identities with known terminal locations, which may be obtained using GPS, A-GPS, etc.

7. Combining Results from Different Positioning Methods

The location of a station (e.g., a terminal or an access point) may be determined using multiple positioning methods. A more accurate and reliable location estimate may be obtained for the station by combining location results from these multiple positioning methods. For the signal strength/quality method, the location result may be a set of possible locations (e.g., pixels), each with an associated probability of occurrence. For the RTT, OTD and TOA methods as well as the GPS and A-GPS methods, the result may be a single location with a surrounding area (e.g., a circle or ellipse) within which the actual location is expected with a particular probability. Each location result may be converted to a probability density function (PDF) that provides, for each possible location, the probability that the station is actually at that location. The probability density functions for all positioning methods may be combined and used to obtain a final location estimate for the station.

Multiple location results may be obtained for a terminal based on multiple independent sets of measurements, $M_1, M_2, \ldots M_N$, where $N \geq 2$. Each set of measurements may be used to obtain a location result. The following may be defined:

E=event that the terminal is at point (x, y)

$F_n$ (x, y)=probability density function (PDF) for the terminal location at point (x, y) based on measurement set $M_n$, for $1 \leq n \leq N$, and F (x, y)=PDF for terminal location at point (x, y) based on all N measurement sets $M_1, M_2, \ldots M_N$.

$F_n$ (x,y) corresponds to the location result obtained with measurement set $M_n$. F (x,y) may be determined by combining $F_n$ (x,y), for $1 \leq n \leq N$, for all N location results.

The measurement sets may be assumed to be independent so that, given any location event E, each measurement set has a certain probability of occurrence dependent on event E that is not additionally dependent on any other measurement set. This condition may be given as:

$$P(M_i/(E \text{ and } M_j))=P(M_i/E) \text{ for } i,j\in\{1,\ldots,N\} \text{ and } i\neq j, \quad \text{Eq (9)}$$

where P (a/b) is the probability of event a conditional on event b.

The location results for all N measurement sets may be combined as follows.

$$F(x, y) = \frac{\prod_{n=1}^{N} F_n(x, y)}{\iint_{x\,y} \prod_{j=1}^{N} F_j(x, y) dx dy}. \quad \text{Eq (10)}$$

Equation (10) gives equal weight to the results from different positioning methods.

The location results for all measurement sets may also be combined with different weighting for different positioning methods, as follows.

$$F(x, y) = \frac{\prod_{n=1}^{N} F_n(x, y)^{p(n)}}{\iint_{x\,y} \prod_{j=1}^{N} F_j(x, y)^{p(j)} dx dy}, \quad \text{Eq (11)}$$

where p(n) is the weight for measurement set $M_n$, for $1 \leq n \leq N$.

The weight may be defined as $0 \leq p(n) \leq 1$. A small value of p(n) may be used for a positioning method that is less reliable, and a large value of p(n) may be used for a measurement set that is more reliable. The weighting may be omitted if the PDFs $F_n$ (x,y) already reflected the accuracy and reliability of the location results. For example, weighting may be omitted when combining location estimates obtained using the OTD method and the GPS or A-GPS methods after the access point locations (for the OTD method) have been determined accurately and consistently over a period of time. Weighting may be applied when combining location estimates from these same positioning methods before the access point locations are considered reliable. In this case, the OTD method may be assigned less weight.

A network server may obtain from a terminal several sets of measurements for different positioning methods such as, e.g., A-GPS, RTT, OTD, TOA, signal strength/quality, etc. The network server may perform location-related computations for each positioning method and may combine the results for all positioning methods into more accurate location information as described above.

8. Evaluating Reliability of Location Information

Some of the positioning methods described above can provide relatively accurate location estimates for access points.

However, unlike base stations in cellular networks, an access point in a WLAN may be a small piece of equipment that may be moved easily. A WLAN operator may periodically move access points in order to improve coverage, add capacity, or reconfigure one or more WLANs. When that occurs, any terminal location obtained using any positioning method that depends on the locations of the moved access points may be inaccurate.

To address this mobility issue, the location of an access point may be periodically verified by determining the access point location using any suitable positioning method and comparing the current location to the previous location of the access point. If the two locations are in agreement, or at least not inconsistent, then the access point may be assumed to have not moved. If the two locations are inconsistent, then the new location and the time at which it was obtained may be stored. The new location may be verified subsequently and, if confirmed a sufficient number of times, may be assumed to be correct. The access point may be deemed to have moved prior to the first time the new location is detected.

The times and frequency in which each access point within a given area is moved may be determined and stored. The resultant movement history information may be used to predict, at any given time, the probability that a given access point has moved in the absence of any reliable means of verifying the movement. The movement of an access point may be predicted based on movement history information for only that access point or all access points in the given area.

Figure 5:
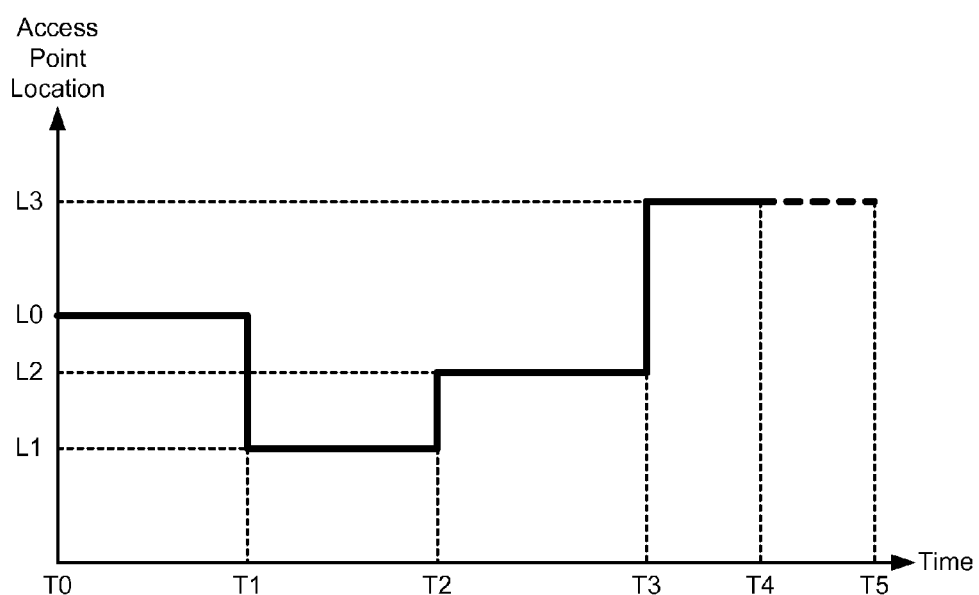
FIG. 5 shows movement history for an access point.

FIG. 5 shows movement history for an access point using a single dimension to represent actual 2 or 3 dimensional locations. The access point is initially at location L0 at time T0. The access point is moved to location L1 at time T1, then to location L2 at time T2, and then to location L3 at time T3. The access point is verified to be at location L3 at time T4. At a later time T5, it is desired to estimate the probability that the access point is still at location L3 or, equivalently, the probability that the access point has moved.

Some or all of the location history information for the access point may be used to determine the probability of the current location. For example, time (T4−T3) during which the access point was fixed at location L3 may be used with the time (T5−T4) during which the access point could have moved. Alternatively, times (T3−T2), (T2−T1) and (T1−T0) between movements may be used to determine statistics on the time duration the access point spent at a given location. Similar statistics may also be obtained for other access points and used to determine the probability of the current location of this access point.

The probability of movement for a given access point k may be determined in various manners. If access point k has moved multiple times, then the average duration D of access point k being in any location may be obtained. The probability of access point k being moved at any time may be assumed to be independent of both time and the duration already spent in the current location. The access point movement may then be represented as a Poisson statistical process. In this case, the probability $P_k$ of access point k location remaining constant for time t may be given as: $P_k = e^{-t/D}$, and the probability that access point k has moved following time t since its location was last verified may be given as: $1-e^{-t/D}$. If access point k has never been observed to move and has been observed to be at the same location for time duration T, then the average duration in any one location may be assumed to be D>T. The probability $P_k$ that access point k has not moved for time t may be given as: $e^{-t/D} = P_k > e^{-t/T}$.

If access point k has moved many times, then the time durations in which the access point remained at different locations may be used to obtain various statistics such as mean duration, variance of the durations, distribution of the durations, etc. This statistical information may replace the Poisson statistical model and may be used to obtain a more reliable estimate of the probability that access point k location has changed.

Access point k may have been stationary or may have moved infrequently so that any estimate of the mean and variance of its duration in one location may be unreliable. In this case, an estimate of the probability that access point k has moved since its location was last verified may be obtained based on statistics collected for a set of access points. This set S may contain all access points in the WLAN, a predetermined number of access points, access points in the same area as access point k, access points belonging to or associated with a particular WLAN operator, etc. If any access point in set S moved, then the time of the move may be determined and used to obtain an expected time duration D between successive moves of any access point in set S. Moves for each access point in set S may be assumed to be Poisson events. If there are N access points in set S, then the mean duration between moves for any access point may be given as N*D, and the probability $P_k$ that access point k has not moved at time t may be given as: $P_k = e^{-t/(N*D)}$. More accurate probabilities of movement may be obtained by using the mean duration N*D determined from movement histories of a set of access points instead of a single access point.

The probability of movement of an access point may also be determined in other manners and/or using other methods. For example, methods for determining reliability of a system or component such as the time to failure of an electrical component may be used to predict movement.

A location estimate may be derived for a terminal based on locations previously obtained for K access points, where K>1. The following may be defined:

$P_k$=location reliability for access point k, for $1 \le k \le K$,
=probability that access point k location has not changed since it was last obtained or last verified, and P=reliability of a location estimate obtained using the locations of all K access points,
=probability that the locations of all K access points have not changed since they were last obtained or last verified.

The reliability of the location estimate for the terminal may be given as:

$$P = \prod_{k=1}^{K} P_k$$

if changes of locations for all access points are independent,      Eq (12)

$$P > \prod_{k=1}^{K} P_k$$

if changes of locations for the access points are correlated.      Eq (13)

Equation (12) indicates that the overall reliability of the location estimate is given by the product of the individual reliabilities when the probability of a change in location of any access point is independent of whether the locations of other access points have changed. The access points used to obtain the location estimate are typically close together, which allows the terminal being located to receive signals from these access points. Thus, movement of one access point may be positively correlated with movement of other access points. For example, if a WLAN operator decides to reconfigure or expand a WLAN, then it is likely that more than one access point would be moved. If a given access point k has moved, this may result in higher probability that a neighbor access point has also moved. If access point k has not moved, this may result in a higher probability that a neighbor access point has not moved, which is reflected in equation (13).

An access point may provide its location, e.g., in beacon frames in IEEE 802.11. The reliability of the access point location may be in question due to various reasons. For example, the access point location may not be correct due to errors in determining the location, errors in manual entry by a WLAN operator, movement of the access point without updating its location, etc. In fact, with so many WLANs now in existence and with a high premium on saving time and resources, it is unlikely that an accurate and reliable location would always be provided.

Positioning methods that make use of access point locations may verify these locations. Once the location of an access point has been verified, it can be discovered whether the location provided by the access point is correct. This may be performed for a large number of access points. For a given access point location that has not been verified, the probability that the location is correct may be determined by assuming equal probability of correctness for any access point. For example, if m out of n access point locations are correct, where m≤n, then the probability that another access point location is correct may be given as m/n. In defining correctness, bounds may be placed on the allowed error (e.g., 50 or 200 meter error) and separate probabilities may be obtained for correctness for different error bounds. Equation (12) may then be used to estimate location reliability for any terminal whose location is determined using access point locations that may be unreliable due any of the reasons noted above. In this case, $P_k$ in equation (12) may represent the probability of correctness of the location provided by an access point or the probability that a previously verified access point location has not changed.

Once an access point location has been obtained or verified, e.g., as described above, it may be used to estimate the locations of other access points. A terminal may provide the identities of all access points received by the terminal. The known location of any received access point may be used as an approximate location for a received access point whose location is currently unknown. This may then be used to approximately locate other terminals, e.g., using the AP ID method. The location estimates for these terminals may be coarse but may be sufficient for A-GPS and other applications that accept low accuracy location results.

9. Location Support with OMA SUPL and 3GPP2 X.S0024

The positioning methods described herein may be supported by terminals, access points, and/or other network entities associated with a WLAN. Positioning for a terminal may occur locally. An entity may request the terminal location from the terminal or the WLAN, e.g., the access point.

It may be more efficient to support positioning of terminals in WLANs by extending existing capabilities of wireless user plane location solutions such as Open Mobile Alliance (OMA) Secure User Plane Location (SUPL) and 3GPP2 X.S0024. The user plane location solutions may be used to support positioning for terminals, store and provide location results, support privacy for a terminal user, support authentication of an entity requesting a terminal location, etc. The user plane location solutions currently support a number of positioning methods such as cell ID with timing advance, E-OTD, OTDOA, and A-FLT, which are applicable to WWANs (e.g., GSM, W-CDMA, and cdma2000 networks) but not WLANs. The user plane location solutions also support other positioning methods such as GPS and A-GPS, which are applicable to various wireless networks where specialized WLAN support is not needed. The user plane location solutions may be enhanced to support positioning methods for WLAN.

Figure 6:
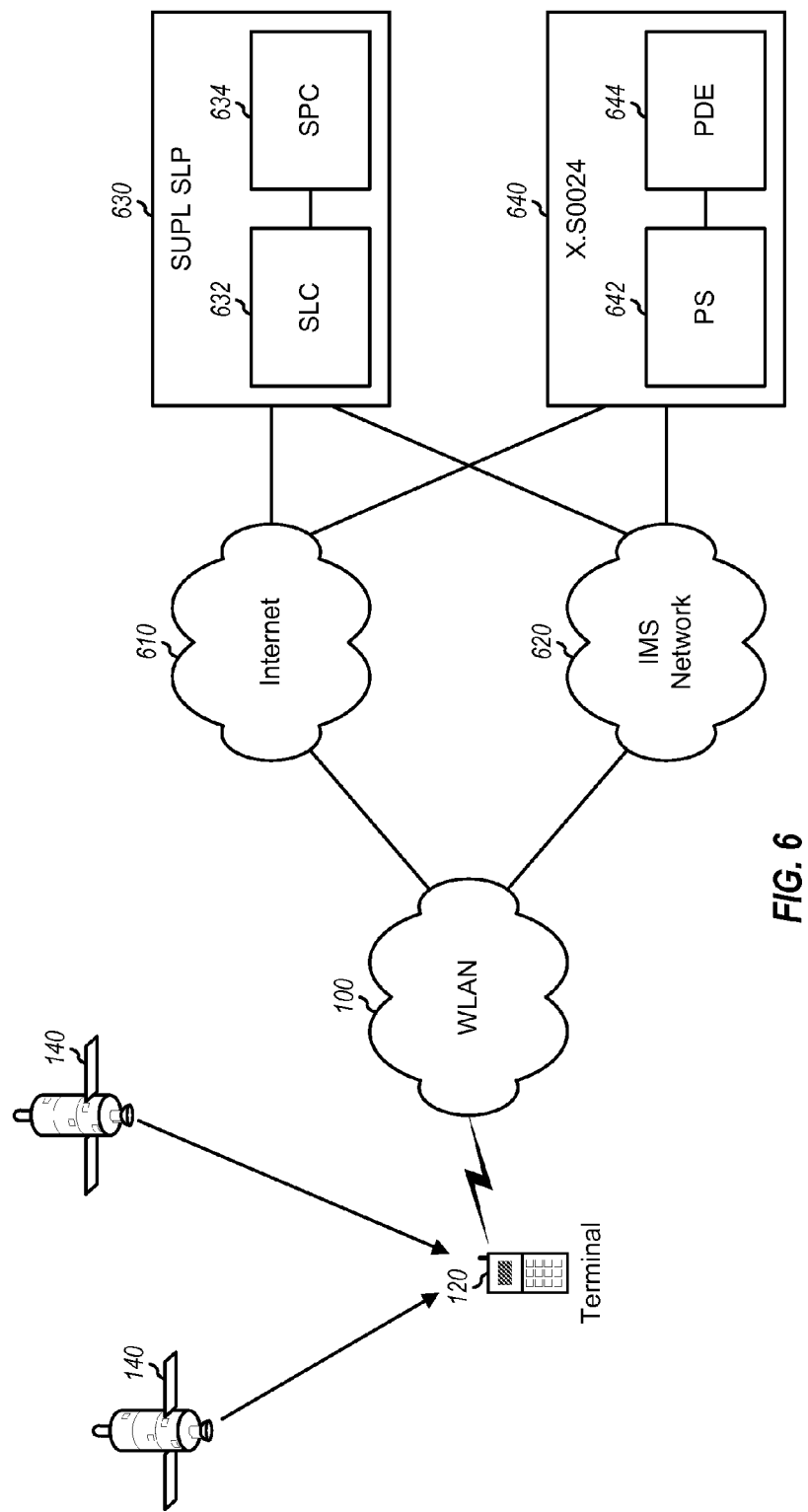
FIG. 6 shows a deployment with user plane location.

FIG. 6 shows a deployment with SUPL and X.S0024. Terminal 120 may use WLAN 100 to access the Internet 610, an IP Multimedia Subsystem (IMS) network 620 in 3GPP or 3GPP2, or other 3GPP or 3GPP2 services as described in 3GPP TS 23.234 and 3GPP2 X.P0028. Terminal 120 may communicate with WLAN 100, which may be used as a Generic Access Network (GAN) to support access to GSM and GPRS as described in 3GPP TS 43.318. Terminal 120 may use WLAN positioning methods within SUPL or X.S0024 when communicating with WLAN 100. In SUPL, a terminal is referred to as a SUPL enabled terminal (SET).

SUPL utilizes a SUPL Location Platform (SLP) 630 that is responsible for SUPL service management and positioning. SUPL service management may include managing locations of SETs and storing, extracting, and modifying location information of target SETs. SLP 630 includes a SUPL Location Center (SLC) 632 and may include a SUPL Positioning Center (SPC) 634. SLC 632 performs various functions for location services, coordinates the operation of SUPL, and interacts with SETs over user plane bearer. SLC 632 may perform functions for privacy, initiation, security, roaming support, charging/billing, service management, position calculation, etc. SPC 634 supports positioning for SETs, is responsible for messages and procedures used for position calculation, and supports delivery of assistance data to the SETs. SPC 634 may perform functions for security, assistance data delivery, reference retrieval, position calculation, etc. SPC 634 has access to GPS receivers (a reference network, perhaps a global one) and receives signals for satellites so that it can provide assistance data.

X.S0024 utilizes location entities 640 that may include an X.S0024 Position Server (PS) 642 and an X.S0024 Position Determining Entity (PDE) 644. PS 642 may perform functions similar to those performed by SLC 632. PDE 644 may perform functions similar to those performed by SPC 634.

WLAN positioning methods may be supported in SUPL or X.S0024 by having new identifiers for these positioning methods in SUPL and X.S0024 and/or by enabling new location-related measurements to be sent from terminals to SUPL or X.S0024 entities. For terminal-based positioning, a terminal performs measurements and computes a location estimate. In this case, the SUPL SLP or SPC and the X.S0024 PS or PDE may send location information to assist the terminal make measurements and/or compute a location estimate. The location information may comprise, e.g., location coordinates of access points, RTD values for the OTD method, etc.

Table 2 lists signaling that may be included in OMA SUPL to support the WLAN positioning methods described herein. For the Cell ID method, cell identity may already be included in SUPL START and SUPL POS INIT messages but may be expanded with new parameters shown in Table 2. The location-related information shown in Table 2 may also be included in other SUPL parameters and messages.

TABLE 2

| WLAN Position Method | SUPL Parameter | SUPL Message | Description |
|---|---|---|---|
| AP ID, RTT, OTD, TOA, and signal strength/ quality | Positioning method | SUPL INIT, SUPL RESPONSE | An identifier is used for each WLAN positioning method, e.g., AP ID, RTT, OTD, TOA, signal strength/quality, etc. |
| | SET capabilities | SUPL START, SUPL POS INIT | An identifier is used for each WLAN positioning method supported by a terminal. |
| | Location ID | SUPL START, SUPL POS INIT | Serving AP identity, e.g., MAC address, IP address, etc. |
| | Location ID or new parameter | SUPL START, SUPL POS INIT | Serving AP location coordinates provided by the AP, e.g., from beacon frame in IEEE 802.11. |
| | Location ID or new parameter | SUPL START, SUPL POS INIT | WLAN technology type, e.g., 802.11b, 802.11g, 802.11n, WiMAX, etc. |
| | Location ID or new parameter | SUPL START, SUPL POS INIT | Transmit power used by a terminal and/or an AP for communication, antenna gain, received signal strength, received signal quality, etc. |
| RTT | Positioning payload, or new SUPL parameter | SUPL POS (from SET to SLP or SPC) | Provide RTT measurement for serving AP, RTT measurements plus AP identities for other APs, etc. |
| | Positioning payload or new SUPL parameter | SUPL RESPONSE, SUPL POS (from SLP or SPC to SET) | Provide serving AP location coordinates, location coordinates plus AP identities for other APs, etc. |
| OTD | Positioning payload, or new SUPL parameter | SUPL POS (from SET to SLP or SPC) | Provide reference AP identity (default is serving AP) and one or more other AP identities. For each other AP identity, provide measured OTD value between this AP and the reference AP, statistics of measurement accuracy and reliability, etc. |
| | Positioning payload or new SUPL parameter | SUPL RESPONSE, SUPL POS (from SLP or SPC to SET) | Provide identities and characteristics of APs that can be measured by a terminal, RTD values between identified APs, locations of identified APs, etc. |
| TOA | Location ID, positioning payload, or new SUPL parameter | SUPL POS INIT, SUPL POS (from SET to SLP or SPC) | Provide absolute TOA (e.g., GPS time) for a signal from serving AP and identity and relative timing (e.g., frame number) of this signal, TOAs for other identified signals from other identified APs, etc. |
| | Positioning payload or new SUPL parameter | SUPL RESPONSE, SUPL POS (from SLP or SPC to SET) | Provide identities and characteristics of APs that can be measured by a terminal, expected TOA values, locations of identified APs and their absolute timing relationship (e.g., to GPS), etc. |
| Signal strength/ quality | Positioning payload, or new SUPL parameter | SUPL POS (from SET to SLP or SPC) | Provide signal strength and/or signal quality for the serving AP, signal strengths and/or qualities for other identified APs, terminal location, etc. |
| | Positioning payload or new SUPL parameter | SUPL RESPONSE, SUPL POS (from SLP or SPC to SET) | Provide location result corresponding to signal strength/quality for a set of pixels contained in a local area in which the terminal is located, etc. |
| Cell ID (e.g., for A-GPS) | Location ID, positioning payload, or new SUPL parameter | SUPL POS INIT, SUPL POS (from SET to SLP or SPC) | Provide global cell ID(s) for cellular networks, TA, RTT, signal strength/quality measurements for each provided cell ID, etc. |
| | Positioning payload or new SUPL parameter | SUPL RESPONSE, SUPL POS (from SLP or SPC to SET) | Provide request for cell ID information and indicate if TA, RTT, signal strength/quality measurements are needed, etc. |

The positioning payload may be a Radio Resource LCS Protocol (RRLP) message in 3GPP, a Radio Resource Control (RRC) message in 3GPP, a TIA-881 message in 3GPP2, etc.

With the features in Table 2, a SUPL SLP or SPC may support the WLAN positioning methods described above. The SLP or SPC may also function as a network server for WLAN positioning methods and perform the operations described above. A SET may function as an identified terminal. Different or additional signaling and features may also be provided in SUPL to support WLAN positioning methods.

Similar signaling and features may also be provided in X.S0024. An X.S0024 PS or PDE may support the WLAN positioning methods described above. The PS may function as a network server for WLAN positioning methods and perform the operations described above. A mobile station (MS) may function as an identified terminal.

10. Location Support with Control Plane Solution

Positioning of terminals in WLANs may also be supported by extending existing capabilities of wireless control plane location solutions for 3GPP and 3GPP2 networks. The control plane location solution for GSM, W-CDMA, and other 3GPP networks is described in 3GPP TS 23.271, 43.059, and 25.305. The control plane location solution for cdma2000 and other 3GPP2 networks is described in X.S0002, TIA-881, and J-STD-036 rev B. These documents are publicly available.

Figure 7:
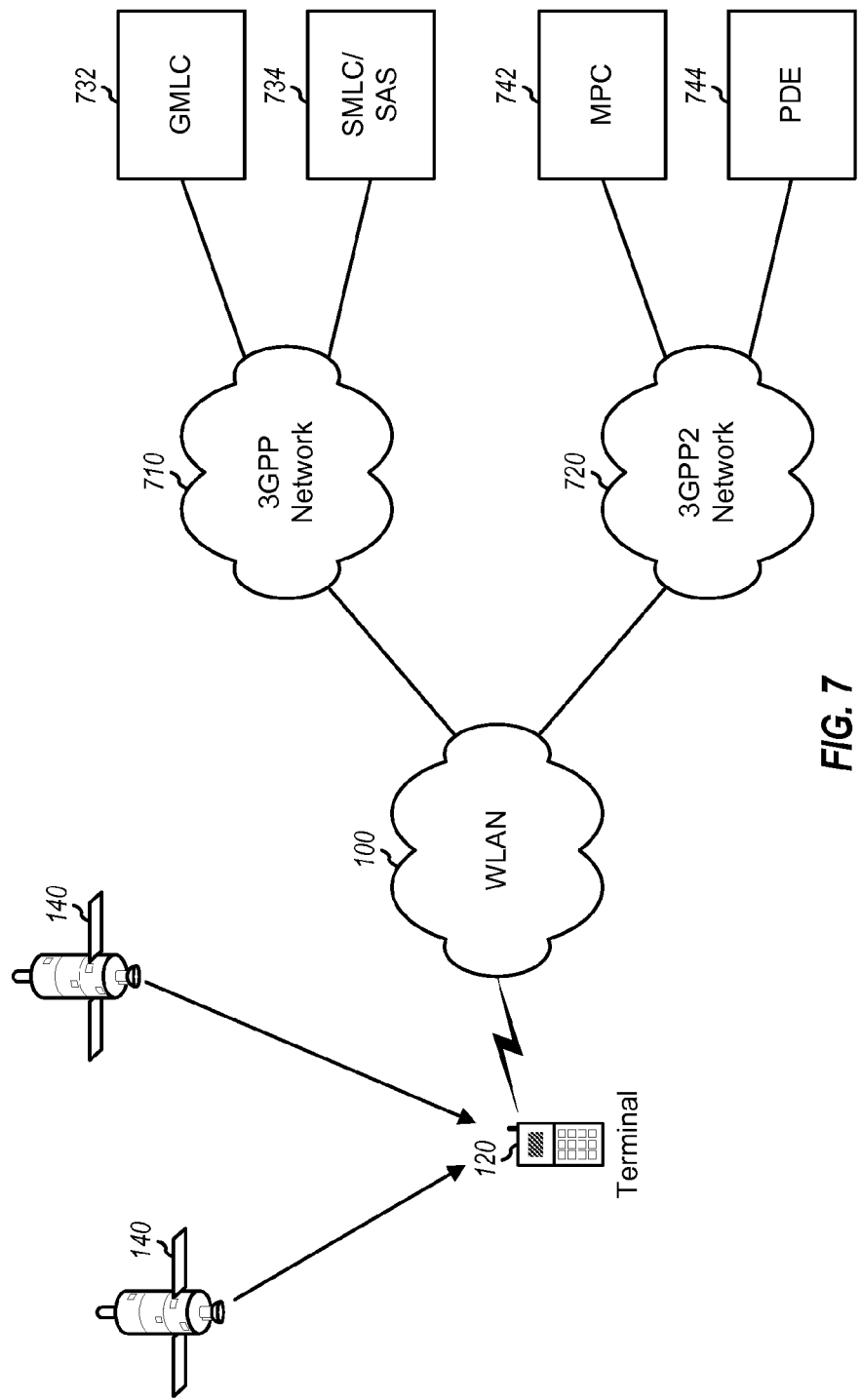
FIG. 7 shows a deployment with control plane location.

FIG. 7 shows a deployment with 3GPP and 3GPP2 control plane location solutions. Terminal 120 uses WLAN 100 to access a 3GPP network 710, a 3GPP2 network 720, or other 3GPP or 3GPP2 services as described, e.g., in 3GPP 23.234 and 3GPP2 X.P0028. 3GPP network 710 may be a GSM network, a W-CDMA network, etc., and may include Base Station Controllers (BSCs), Radio Network Controllers (RNCs), etc. 3GPP2 network 720 may be a cdma2000 network, etc., and may include BSCs, etc. Terminal 120 may communicate with WLAN 100, which may be used as a GAN to support access to GSM and GPRS as described in 3GPP TS 43.318. Terminal 120 may use WLAN positioning methods when communicating with WLAN 100.

The 3GPP control plane location solution utilizes location entities that may include a Gateway Mobile Location Center (GMLC) 732 and a Serving Mobile Location Center (SMLC)/Standalone SMLC (SAS) 734. GMLC 732 may provide various services such as subscriber privacy, authorization, authentication, billing, etc. SMLC/SAS 734 may support positioning for terminals. The 3GPP2 control plane location solution utilizes location entities that may include a Mobile Positioning Center (MPC) 742 and a PDE 744, which may function in similar manners as GMLC 732 and SMLC/SAS 734, respectively.

For 3GPP control plane location solution, new signaling and features may be added to an RRLP protocol used for location in GSM networks and described in 3GPP 44.031 and/or an RRC protocol used for location in W-CDMA networks and described in 3GPP 25.331. The new signaling and features may be the same as or similar to the signaling and features in Table 2 but would be added to RRLP and/or RRC messages instead of SUPL messages. The new signaling and features may be extended to support positioning of terminals accessing a 3GPP GAN supported by a WLAN. For 3GPP, an SMLC, a SAS, a BSC, an RNC, or a Generic Access Network Controller (GANC) may function as a network server and perform the operations described above for WLAN positioning methods. A user equipment (UE) or a mobile station (MS) may function as an identified terminal. The new signaling and features for RRLP and RRC may also be used to support SUPL because both RRLP and RRC may be used as part of SUPL.

For 3GPP2 control plane location solution, new signaling and features may be added to a protocol defined in TIA-801 and 3GPP2 C.S0022. The new signaling and features may be the same as or similar to the signaling and features in Table 2 but would be added to the TIA-801/C.S0022 protocol. For 3GPP2, a PDE may function as a network server and perform the operations described above for WLAN positioning methods. A mobile station (MS) in 3GPP2 may function as an identified terminal. The new signaling and features for TIA-801/C.S0022 may also be used to support SUPL because the TIA-801/C.S0022 protocol may be used as part of SUPL.

The WLAN positioning methods described herein may also be applicable to other types of wireless network. In these cases, the role of an access point in a WLAN may be replaced by a base station, e.g., a GSM, W-CDMA or cdma2000 base station. The measurements associated with an access point may also be replaced by corresponding measurements for one or more base stations. The positioning methods described herein to locate a terminal or an access point in a WLAN may be used to locate a base station.

Figure 8:
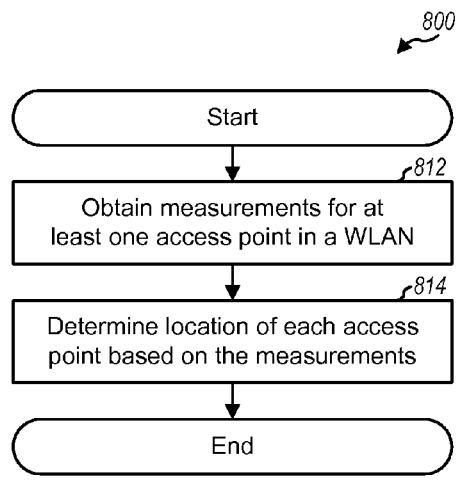
FIG. 8 shows a process for positioning one or more access points.

FIG. 8 shows a process 800 for positioning access points. Measurements are obtained for at least one access point in a WLAN (block 812). The measurements may be based on transmission sequences (e.g., beacon frames) transmitted periodically by each access point. The measurements may be made by multiple terminals at different locations or a single terminal at different locations. The location of each access point is determined based on the measurements and in accordance with a positioning method (block 814).

For the RTT method, RTT measurements may be made by at least one terminal for a single access point. The location of the access point may then be determined based on the RTT measurements and known locations of the at least one terminal.

For the OTD method, OTD measurements may be made by at least one terminal for a pair of access points. The location of each access point may then be determined based on the OTD measurements and known locations of the at least one terminal. RTD values may be determined for the OTD measurements, e.g., based on a function that accounts for timing drift in the transmissions used to obtain the OTD measurements. The location of each access point may then be determined further based on the RTD values.

For the TOA method, TOA measurements may be made by at least one terminal for a single access point. The location of the access point may then be determined based on the TOA measurements and known locations of the at least one terminal. For example, OTD measurements for at least one pair of terminals may be determined based on TOA measurements made by multiple terminals. The location of the access point may then be determined based on the OTD measurements and the known locations of the terminals.

Figure 9:
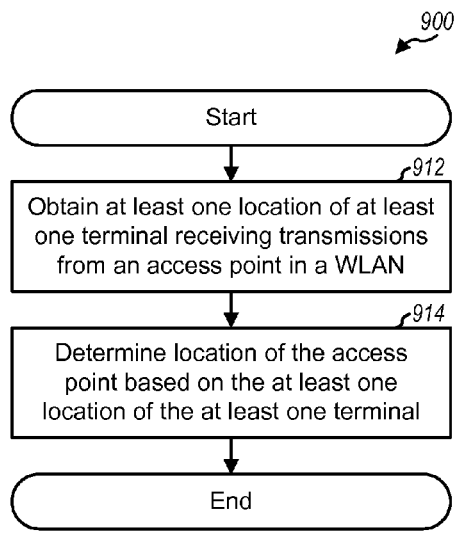
FIG. 9 shows a process for positioning an access point.

FIG. 9 shows a process 900 for positioning an access point. At least one location of at least one terminal receiving transmissions from an access point in a WLAN is obtained (block 912). The location of the access point is determined based on the at least one location of the at least one terminal (block 914). The location of the access point may be determined further based on a range limit of a radio technology (e.g., IEEE 802.11) used by the WLAN, transmit power used by the at least one terminal or the access point, etc. The location of the access point may be determined based on (a) average coordinates of the at least one location of the at least one terminal, (b) a centroid of a geographic area covering the at least one terminal, or (c) some other point determined based on the at least one terminal location.

Figure 10:
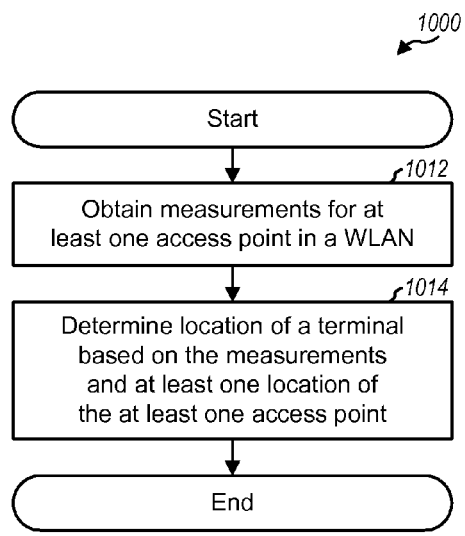
FIG. 10 shows a process for positioning a terminal.

FIG. 10 shows a process 1000 for positioning a terminal. Measurements for or from at least one access point in a WLAN are obtained (block 1012). The location of the terminal is determined based on the measurements and at least one location of the at least one access point (block 1014).

For the RTT method, RTT measurements may be made by the terminal for the at least one access point. The location of the terminal may then be determined based on the RTT measurements and known locations of the at least one access point. For the OTD method, OTD measurements may be made by the terminal for at least two pairs of access points. The location of the terminal may then be determined based on the OTD measurements and known locations of the access points. For the TOA method, TOA measurements may be made by at least three access points for the terminal. The location of the terminal may then be determined based on the TOA measurements and known locations of the access points.

For the AP ID method, the measurements may provide at least one identity of the at least one access point, e.g., the serving access point. The location of each access point may be obtained based on its identity. The location of the terminal may then be determined based on at least one location of the at least one access point. For the signal strength/quality method, signal strength measurements, signal quality measurements, or both may be made by the terminal for the at least one access point. The location of the terminal may then be determined based on the measurements and the identity of each access point.

For all positioning methods, the location of the terminal may be determined further based on the reliability of the location of each access point, which may be determined based on location history information for only that access point or a set of access points.

Figure 11:
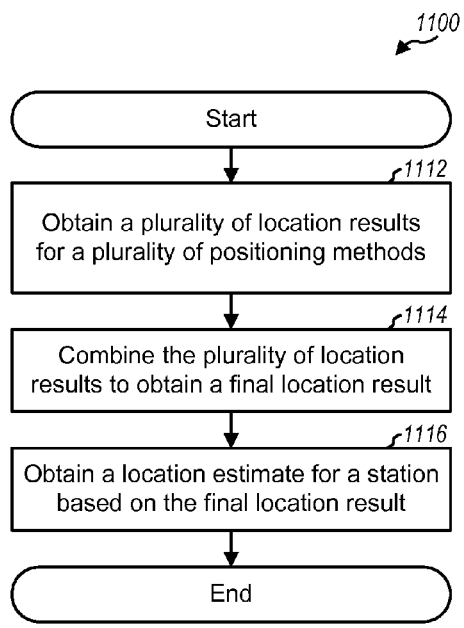
FIG. 11 shows a process for combining location results.

FIG. 11 shows a process 1100 for combining location results. A plurality of location results is obtained for a plurality of positioning methods (block 1112). The positioning methods may include any one or any combination of the AP ID method, RTT method, OTD method, TOA method, signal strength/quality method, cell ID method, GPS, A-GPS, etc. The plurality of location results is combined to obtain a final location result (block 1114). A location estimate for a station is obtained based on the final location result (block 1116). The location results may correspond to probability density functions for possible locations of the station. The probability density functions may be combined to obtain a final probability density function. The location results may be weighted based on the reliability of the positioning methods prior to combining. The location estimate for the station may then be obtained based on the final probability density function.

Figure 12:
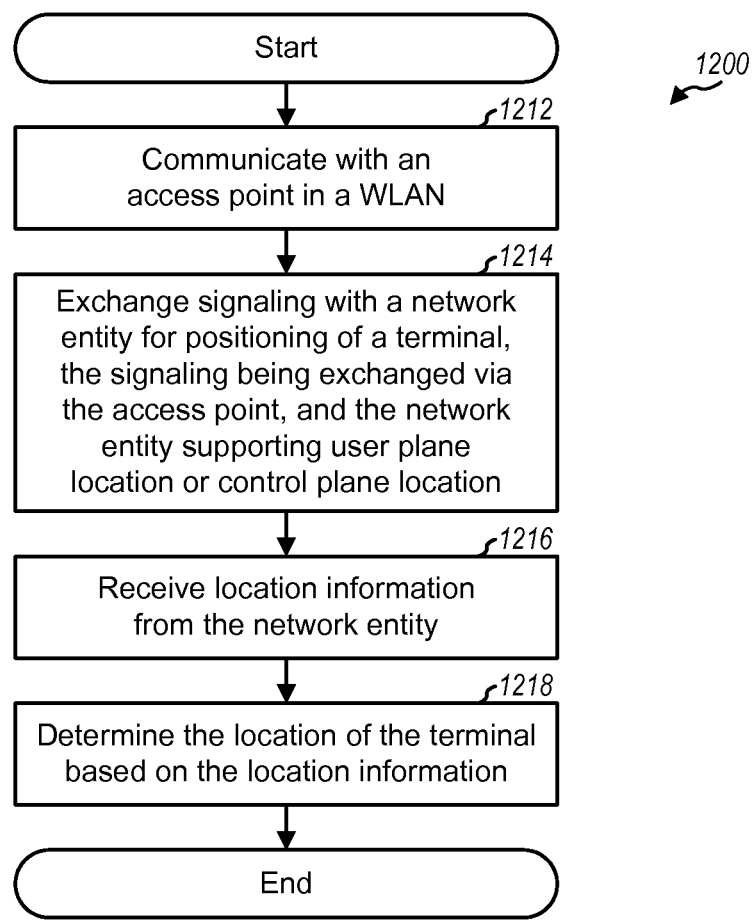
FIG. 12 shows WLAN positioning with user/control plane location.

FIG. 12 shows a process 1200 for performing positioning with user plane or control plane location. A terminal communicates with an access point in a WLAN (block 1212). The terminal exchanges signaling with a network entity for positioning of the terminal (block 1214). The signaling is exchanged via the access point. The network entity supports user plane location (e.g., SUPL or X.S0024) or control plane location (e.g., for 3GPP or 3GPP2). The terminal receives location information from the network entity (block 1216). The location information may comprise access point locations, access point identities, access point timing information, assistance data, etc., and may be used to make measurements, compute a location estimate, etc. The terminal may determine its location based on the location information (block 1218).

For terminal-based positioning, the terminal may obtain measurements for at least one access point in the WLAN, e.g., a serving access point and/or other access points. The measurements may be RTT measurements, OTD measurements, TOA measurements, signal strength measurements, signal quality measurements, etc. The terminal then determines its location based on the measurements and the location information (e.g., access point locations) received from the network entity.

For terminal-assisted positioning, the terminal may obtain measurements for at least one access point in the WLAN based on location information received from the network entity. The terminal may send the measurements to the network entity. The network may then determine the location of the terminal based on the measurements and may provide the location estimate to the terminal.

Location estimates obtained for a terminal using any of the methods identified above may also be used to improve the accuracy and reliability of other location methods (e.g. GPS and A-GPS) in situations and environments where these other location methods may otherwise be insufficiently accurate and/or reliable.

Figure 13:
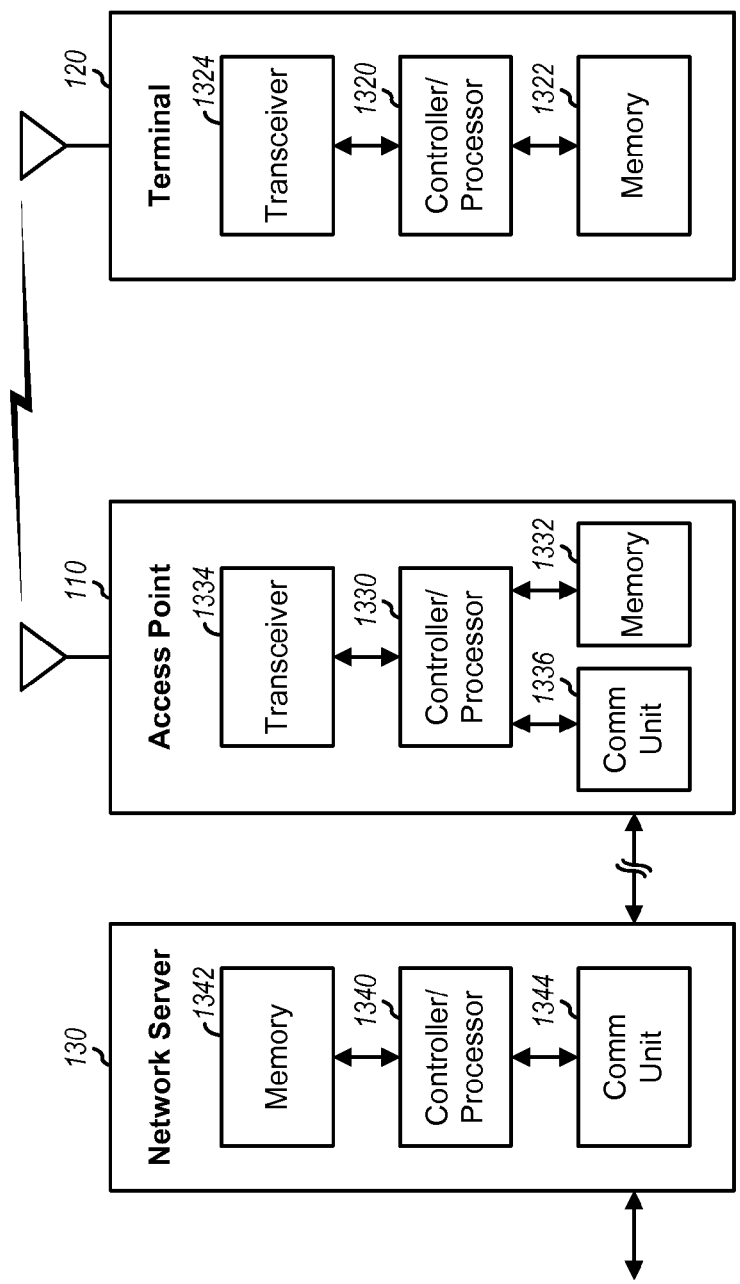
FIG. 13 shows an access point, a terminal, and a network server.

FIG. 13 shows a block diagram of one access point 110, one terminal 120, and network server 130 in FIG. 1. For simplicity, FIG. 13 shows only one controller/processor 1320, one memory 1322, and one transceiver 1324 for terminal 120, only one controller/processor 1330, one memory 1332, one transceiver 1334, and one communication (Comm) unit 1336 for access point 110, and only one controller/processor 1340, one memory 1342, and one communication unit 1344 for network server 130. In general, each entity may include any number of processors, controllers, memories, transceivers, communication units, etc. Terminal 120 may support wireless communication with one or more other wireless networks, e.g., GSM, W-CDMA, and/or cdma2000 networks. Terminal 120 may also receive and process signals from one or more satellite positioning systems, e.g., GPS, Galileo, etc.

On the downlink, access point 110 transmits traffic data, signaling, and pilot to terminals within its coverage area. These various types of data are processed by processor 1330 and conditioned by transceiver 1334 to generate a downlink signal, which is transmitted via an antenna. At terminal 120, the downlink signals from one or more access points are received via an antenna, conditioned by transceiver 1324, and processed by processor 1320 to obtain various types of information. For example, transceiver 1324 and/or processor 1320 may make various measurements for any of the WLAN positioning methods described above. Memories 1322 and 1332 store program codes and data for terminal 120 and access point 110, respectively.

On the uplink, terminal 120 may transmit traffic data, signaling, and pilot to one or more access points in WLAN 100. These various types of data are processed by processor 1320 and conditioned by transceiver 1324 to generate an uplink signal, which is transmitted via the terminal antenna. At access point 110, the uplink signals from terminal 120 and other terminals are received and conditioned by transceiver 1334 and further processed by processor 1330 to obtain various types of information from the terminal. Access point 110 may directly or indirectly communicate with network server 130 via communication unit 1336.

Within network server 130, processor 1340 performs processing for any of the WLAN positioning methods described above. For example, processor 1340 may build and maintain databases for various WLAN positioning methods, provide location information to terminals, compute location estimates for terminals and/or access points, etc. Memory 1342 stores program codes and data for network server 130. Communication unit 1344 allows network server 130 to communicate with access point 110 and/or other network entities.

The techniques described herein may be implemented by various means. For example, these techniques may be implemented in hardware, firmware, software, or a combination thereof. For a hardware implementation, the processing units used to perform positioning at a station (e.g., a terminal, an access point, or some other entity) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc) that perform the functions described herein. The firmware and/or software codes may be stored in a memory (e.g., memory 1322, 1332 or 1342 in FIG. 13) and executed by a processor (e.g., processor 1320, 1330 or 1340). The memory may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
    a processor configured to:
        obtain measurements from at least one mobile terminal related to Observed Time Difference (OTD) for at least a pair of access points in a wireless local area network (WLAN), wherein the measurements are associated with a plurality of terminal locations and comprise OTD measurements made by multiple ones of the at least one mobile terminal at different terminal locations for the pair of access points,
        obtain the terminal locations for the at least one mobile terminal, and
        determine a location of each access point based on the OTD measurements and the terminal locations; and
    a memory coupled to the processor.

2. The apparatus of claim 1, wherein the measurements are based on transmission sequences transmitted periodically by the at least a pair of access points.

3. The apparatus of claim 1, wherein the processor is configured to determine real time difference (RTD) values for the OTD measurements and determines the location of each access point further based on the RTD values.

4. The apparatus of claim 3, wherein the processor is configured to determine the RTD values based on a function that accounts for timing drift in transmissions used to obtain the OTD measurements.

5. An apparatus comprising:
    a processor configured to:
        obtain a plurality of mobile station location results for a plurality of different positioning methods,
        combine the plurality of location results by weighting each of the plurality of location results with a respective weight associated with the respective one of the plurality of positioning methods used to obtain the result,
        obtain a final location result, and
        obtain a location estimate for a mobile station based on the final location result, wherein the plurality of location results correspond to a plurality of probability density functions for possible location of the station, and wherein the processor is configured to combine the plurality of probability density functions to obtain a final probability density function and obtain the location estimate for the station based on the final probability density function; and
    a memory coupled to the processor.

6. The apparatus of claim 5, wherein the processor is configured to weight the plurality of location results based on reliability of the plurality of positioning methods.

7. The apparatus of claim 5, wherein the plurality of positioning methods comprise at least one positioning method selected from the group comprising an access point identity (AP ID) method, a round trip time (RTT) method, an observed time difference (OTD) method, a time of arrival (TOA) method, a signal strength or signal quality method, a Global Positioning System (GPS) method, and an assisted GPS (A-GPS) method.

8. A method of determining location of a wireless station in a communication system, the method comprising:
    obtaining a plurality of mobile station location results for a plurality of different positioning methods;
    weighting each of the plurality of location results with a respective weight associated with the respective one of the plurality of positioning methods used to obtain the result;
    combining the plurality of weighted location results to obtain a final location result; and
    obtaining a location estimate for a mobile station based on the final location result, wherein the combining the plurality of location results comprises combining a plurality of probability density functions for the plurality of location results to obtain a final probability density function for the final location result, and wherein the obtaining the location estimate comprises obtaining the location estimate for the station based on the final probability density function.

9. An apparatus comprising:
    a processor configured to:
        communicate with a wireless access point in a wireless local area network (WLAN),
        exchange signaling with a network positioning entity for positioning of the wireless access point,
        receive location information from the network positioning entity, and
        determine location of the wireless access point based on the location information,
        wherein the location information includes at least one of serving access point location coordinates provided by a serving access point, WLAN technology type, a round trip time measurement value, an absolute time of arrival value, or a measured observed time difference value, wherein the signaling is exchanged via the wireless access point, and wherein the network entity supports user plane location or control plane location; and
    a memory coupled to the processor.

10. The apparatus of claim 9, wherein the network entity supports Secure User Plane Location (SUPL) or X.50024.

11. The apparatus of claim 9, wherein the network entity supports control plane location used for 3GPP networks or 3GPP2 networks.

12. A method of determining location of a wireless access point in a communication system, the method comprising:
    communicating with the wireless access point in a wireless local area network (WLAN);
    exchanging signaling with a network positioning entity for positioning of the wireless access point;
    receiving location information from the network positioning entity; and determining location of the wireless access point based on the location information, wherein the location information includes at least one of serving access point location coordinates provided by a serving access point, WLAN technology type, a round trip time measurement value, an absolute time of arrival value, or a measured observed time difference value, wherein the signaling is exchanged via the wireless access point, and wherein the network entity supports user plane location or control plane location.

13. An apparatus comprising:

means for communicating with a wireless access point in a wireless local area network (WLAN);

means for exchanging signaling with a network positioning entity for positioning of the wireless access point;

means for receiving location information from the network positioning entity; and means for determining location of the wireless access point based on the location information, wherein the location information includes at least one of serving access point location coordinates provided by a serving access point, WLAN technology type, a round trip time measurement value, an absolute time of arrival value, or a measured observed time difference value, wherein the signaling is exchanged via the wireless access point, and wherein the network entity supports user plane location or control plane location.

14. A computer program product residing on a processor-executable non-transitory computer storage medium, the computer program product comprising processor-executable instructions configured to cause a processor to:

communicate with a wireless access point in a wireless local area network (WLAN);

exchange signaling with a network positioning entity for positioning of the wireless access point;

receive location information from the network positioning entity; and determine location of the wireless access point based on the location information, wherein the location information includes at least one of serving access point location coordinates provided by a serving access point, WLAN technology type, a round trip time measurement value, an absolute time of arrival value, or a measured observed time difference value, wherein the signaling is exchanged via the wireless access point, and wherein the network entity supports user plane location or control plane location.

15. An apparatus comprising:

a processor configured to:

obtain Time of Arrival (TOA) measurements from multiple mobile terminals for a single access point in a wireless local area network (WLAN), wherein the TOA measurements are made by the multiple mobile terminals from a respective multiple terminal locations, obtain the multiple terminal locations for the multiple mobile terminals, derive Observed Time Difference (OTD) measurements for at least one pair of the multiple mobile terminals based on the TOA measurements made by the multiple mobile terminals, and determine a location of the single access point based on the OTD measurements, and the multiple terminal locations; and a memory coupled to the processor.

16. A method of determining locations of access points in a communication system, comprising:

obtaining measurements from at least one mobile terminal related to Observed Time Difference (OTD) for at least a pair of access points in a wireless local area network (WLAN), wherein the measurements are associated with a plurality of terminal locations and comprise OTD measurements made by multiple ones of the at least one mobile terminal at different terminal locations for the pair of access points;

obtaining the terminal locations for the at least one mobile terminal; and determining the locations of each access point based on the OTD measurements and the terminal locations.

17. An apparatus for determining locations of access points in a communication system, comprising:

means for obtaining measurements from at least one mobile terminal related to Observed Time Difference (OTD) for at least a pair of access points in a wireless local area network (WLAN), wherein the measurements are associated with a plurality of terminal locations and comprise OTD measurements made by multiple ones of the at least one mobile terminal at different terminal locations for the pair of access points;

means obtaining the terminal locations for the at least one mobile terminal; and means for determining the locations of each access point based on the OTD measurements and the terminal locations.

* * * * *